(12) United States Patent
Murakami

(10) Patent No.: US 12,379,292 B2
(45) Date of Patent: Aug. 5, 2025

(54) SAMPLE PRODUCING APPARATUS

(71) Applicant: HIRATA CORPORATION, Kumamoto (JP)

(72) Inventor: Seigo Murakami, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 757 days.

(21) Appl. No.: 17/680,710

(22) Filed: Feb. 25, 2022

(65) Prior Publication Data

US 2022/0178796 A1 Jun. 9, 2022

Related U.S. Application Data

(63) Continuation of application No. PCT/JP2020/032601, filed on Aug. 28, 2020.

(30) Foreign Application Priority Data

Sep. 4, 2019 (JP) ................................ 2019-161425

(51) Int. Cl.
| | | |
|---|---|---|
| *G01N 1/00* | (2006.01) | |
| *G01N 1/31* | (2006.01) | |
| *G01N 35/00* | (2006.01) | |
| *G01N 35/10* | (2006.01) | |

(52) U.S. Cl.
CPC ....... *G01N 1/312* (2013.01); *G01N 35/00029* (2013.01); *G01N 35/10* (2013.01); *G01N 2035/00168* (2013.01); *G01N 2035/1027* (2013.01)

(58) Field of Classification Search
None
See application file for complete search history.

(56) References Cited

U.S. PATENT DOCUMENTS

| | | | |
|---|---|---|---|
| 3,432,275 | A | 3/1969 | Unger |
| 4,210,099 | A | 7/1980 | Lux et al. |
| 6,568,447 | B1 | 5/2003 | Sakai et al. |
| (Continued) | | | |

FOREIGN PATENT DOCUMENTS

| | | |
|---|---|---|
| CN | 107530704 A | 1/2018 |
| CN | 113383223 A | 9/2021 |
| (Continued) | | |

OTHER PUBLICATIONS

International Search Report (PCT/ISA/210) with translation and Written Opinion (PCT/ISA/237) mailed on Dec. 3, 2019, by the Japan Patent Office as the International Searching Authority for International Application No. PCT/JP2019/034768. (13 pages).

(Continued)

*Primary Examiner* — Jyoti Nagpaul
(74) *Attorney, Agent, or Firm* — Buchanan Ingersoll & Rooney PC

(57) ABSTRACT

A sample producing apparatus produces an observation sample by placing an observation target object on a surface of a liquid pool on an optically transparent plate and then removing the liquid pool. The sample producing apparatus comprises a holding means for holding the plate, and a tilting means for tilting the plate such that the liquid pool on the plate is flowed. According to the sample producing apparatus, the working efficiency when producing the observation sample is improved.

20 Claims, 20 Drawing Sheets

(56) References Cited

U.S. PATENT DOCUMENTS

| | | | |
|---|---|---|---|
| 8,128,870 B2* | 3/2012 | Nedu | G01N 35/02 |
| | | | 422/65 |
| 9,423,325 B2 | 8/2016 | Enomoto et al. | |
| 2004/0253662 A1 | 12/2004 | Heid et al. | |
| 2005/0186114 A1 | 8/2005 | Reinhardt et al. | |
| 2010/0070069 A1 | 3/2010 | Hofstadler et al. | |
| 2011/0215081 A1 | 9/2011 | Beer | |
| 2012/0320365 A1 | 12/2012 | Bartko et al. | |
| 2014/0287456 A1 | 9/2014 | Angros | |
| 2015/0268141 A1 | 9/2015 | Miyatani | |
| 2015/0292992 A1 | 10/2015 | Enomoto et al. | |
| 2015/0362352 A1 | 12/2015 | Garrepy et al. | |
| 2016/0341638 A1 | 11/2016 | Williams et al. | |
| 2017/0131303 A1 | 5/2017 | Reinhardt et al. | |
| 2018/0078941 A1 | 3/2018 | Kaffka | |
| 2018/0188140 A1 | 7/2018 | Kubota et al. | |
| 2019/0195756 A1 | 6/2019 | Aoki et al. | |
| 2021/0318210 A1 | 10/2021 | Murakami | |
| 2022/0178792 A1 | 6/2022 | Murakami | |

FOREIGN PATENT DOCUMENTS

| | | | |
|---|---|---|---|
| EP | 3889572 A1 | 10/2021 | |
| JP | 2000074803 A | 3/2000 | |
| JP | 2001027731 A | 1/2001 | |
| JP | 2001296219 A | 10/2001 | |
| JP | 2002267942 A | 9/2002 | |
| JP | 2005509154 A | 4/2005 | |
| JP | 2005300434 A | 10/2005 | |
| JP | 2006308575 A | 11/2006 | |
| JP | 2007127465 A | 5/2007 | |
| JP | 2008076249 A | 4/2008 | |
| JP | 2008151657 A | 7/2008 | |
| JP | 2008209269 A | 9/2008 | |
| JP | 2010054482 A | 3/2010 | |
| JP | 2010266394 A | 11/2010 | |
| JP | 2012508888 A | 4/2012 | |
| JP | 2013088387 A | 5/2013 | |
| JP | 2014095588 A | 5/2014 | |
| JP | 2017187409 A | 10/2017 | |
| JP | 2017198635 A | 11/2017 | |
| JP | 2018040788 A | 3/2018 | |
| JP | 2021039033 A | 3/2021 | |
| WO | 2012005110 A1 | 1/2012 | |
| WO | 2014073533 A1 | 5/2014 | |
| WO | 2017038323 A1 | 3/2017 | |
| WO | 2018043655 A1 | 3/2018 | |
| WO | 2019017291 A1 | 1/2019 | |

OTHER PUBLICATIONS

International Preliminary Report on Patentability (PCT/IPEA/409) issued on Nov. 24, 2021, by the Japan Patent Office as the International Searching Authority for International Application No. PCT/JP2019/034768. (14 pages).
International Search Report (PCT/ISA/210) with translation and Written Opinion (PCT/ISA/237) mailed on Oct. 27, 2020, by the Japan Patent Office as the International Searching Authority for related International Application No. PCT/JP2020/032601. (12 pages).
Office Action issued on Jun. 30, 2023, in Chinese Patent Application No. 201980099925.7 and English translation of the Office Action. (27 pages).
Office Action (Notice of Reasons for Refusal) issued on Nov. 6, 2023, in Japanese Patent Application No. 2023-027452 and English translation of the Office Action. (9 pages).
Office Action (Notice of Reasons for Refusal) issued on Nov. 6, 2023, in Japanese Patent Application No. 2023-027453 and English translation of the Office Action. (8 pages).
Office Action (Notice of Reasons for Refusal) issued on Nov. 6, 2023, in Japanese Patent Application No. 2023-027454 and English translation of the Office Action. (6 pages).
Extended European Search Report dated Aug. 16, 2022, issued in corresponding European Application No. 20861843.9. (12 pages).
Extended European Search Report dated Jul. 22, 2022, issued in corresponding European Application No. 19944010.8. (11 pages).
Office Action issued by the U.S. Patent and Trademark Office in U.S. Appl. No. 17/681,476, mailed Jan. 30, 2025, U.S. Patent and Trademark Office, Alexandria, VA. (38 pages).
Office Action (Notice of Reasons for Refusal) issued on Dec. 2, 2024, in corresponding Japanese Patent Application No. 2024-025584 and machine English translation of the Office Action. (7 pages).

* cited by examiner

SAMPLE PRODUCING APPARATUS

CROSS-REFERENCE TO RELATED APPLICATION(S)

This application is a continuation of International Patent Application No. PCT/JP2020/032601 filed on Aug. 28, 2020, which claims priority to and the benefit of Japanese Patent Application No. 2019-161425 filed Sep. 4, 2019, the entire disclosures of which are incorporated herein by reference.

TECHNICAL FIELD

The present invention mainly relates to a sample producing apparatus.

BACKGROUND ART

An observation sample used in a microscope observation or the like is generally produced by placing an observation target object such as a tissue piece on an optically transparent plate that is also called a microscope slide (see PTL 1).

CITATION LIST

Patent Literature

PTL 1: Japanese Patent Laid-Open No. 2010-266394

SUMMARY OF INVENTION

Technical Problem

In a sample producing apparatus configured to produce the observation sample, improvements are required from various viewpoints such that an operator can produce an observation sample at a high working efficiency in a relatively short moving distance or within a predetermined moving range.

It is one of the objects of the present invention to improve the working efficiency when producing an observation sample.

Solution to Problem

One aspect of the present invention is related to a sample producing apparatus, and the sample producing apparatus is a sample producing apparatus configured to produce an observation sample formed by imparting an observation target object onto an optically transparent plate, characterized by comprising a housing including an exterior panel of the sample producing apparatus, a holding portion capable of holding the plate, which a working subject can access to impart the observation target object onto the plate, a moving unit capable of moving the holding portion to an imparting region where the working subject imparts the observation target object onto the plate, and a control unit configured to control the moving unit, wherein the imparting region is provided at a corner portion close to both a front wall portion and one side wall portion of the housing, and the control unit controls the moving unit such that the holding portion moves from a supply position of the plate to the holding portion to an imparting position of the observation target object by the working subject in the imparting region.

Other features and advantages of the present invention will be apparent from the following description taken in conjunction with the accompanying drawings. Note that the same reference numerals denote the same or like components throughout the accompanying drawings.

Advantageous Effects of Invention

According to the present invention, the working efficiency when producing an observation sample is improved.

BRIEF DESCRIPTION OF DRAWINGS

The accompanying drawings, which are incorporated in and constitute a part of the specification, illustrate embodiments of the invention and, together with the description, serve to explain principles of the invention.

DESCRIPTION OF EMBODIMENTS

Figure 1:
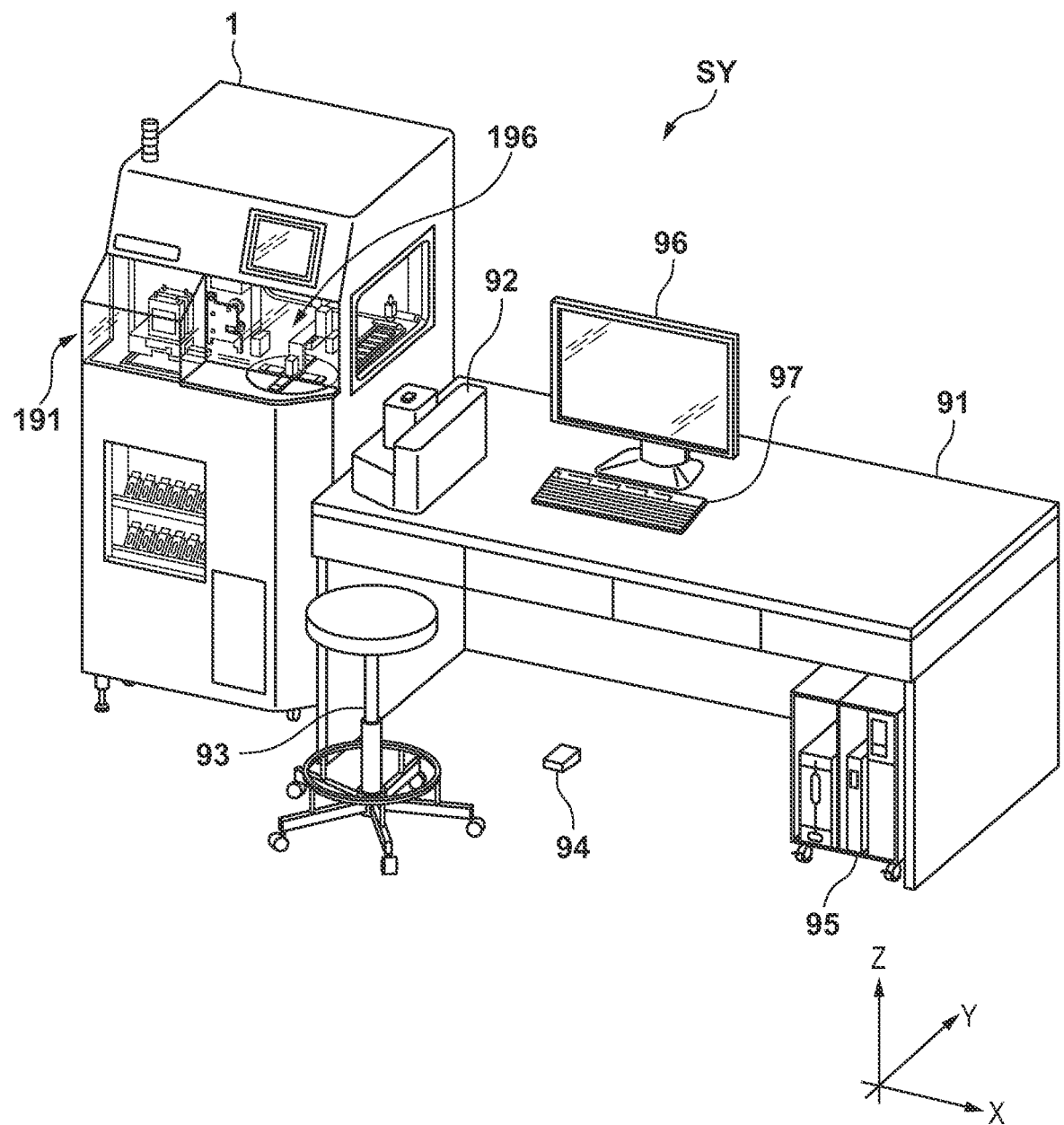
FIG. 1 is a perspective view showing an example of the configuration of a sample producing system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

[Sample Producing System]

FIG. 1 is a perspective view showing an example of the entire configuration of a sample producing system SY according to the first embodiment. The system SY includes a sample producing apparatus 1, a working table 91, an observation target object producing device 92, a chair 93, an input device 94, a computer 95, a display terminal 96, and an input terminal 97.

To facilitate understanding, FIG. 1 shows an X direction, a Y direction, and a Z direction, which cross each other (these are sometimes shown in other views to be described later). The X direction is one direction in the horizontal direction of the sample producing apparatus 1 and corresponds to the left-and-right direction or the widthwise direction. The Y direction is the other direction orthogonal to the one direction in the horizontal direction of the sample producing apparatus 1 and corresponds to the front-and-rear direction or the depth direction. The Z direction is the vertical direction of the sample producing apparatus 1 and corresponds to the up-and-down direction or the height direction. For example, the side in the −Y direction corresponds to the front side, and the side in the +Y direction corresponds to the rear side. Also, for example, the side in the +Z direction corresponds to the upper side, and the side in the −Z direction corresponds to the lower side.

Figure 2A:
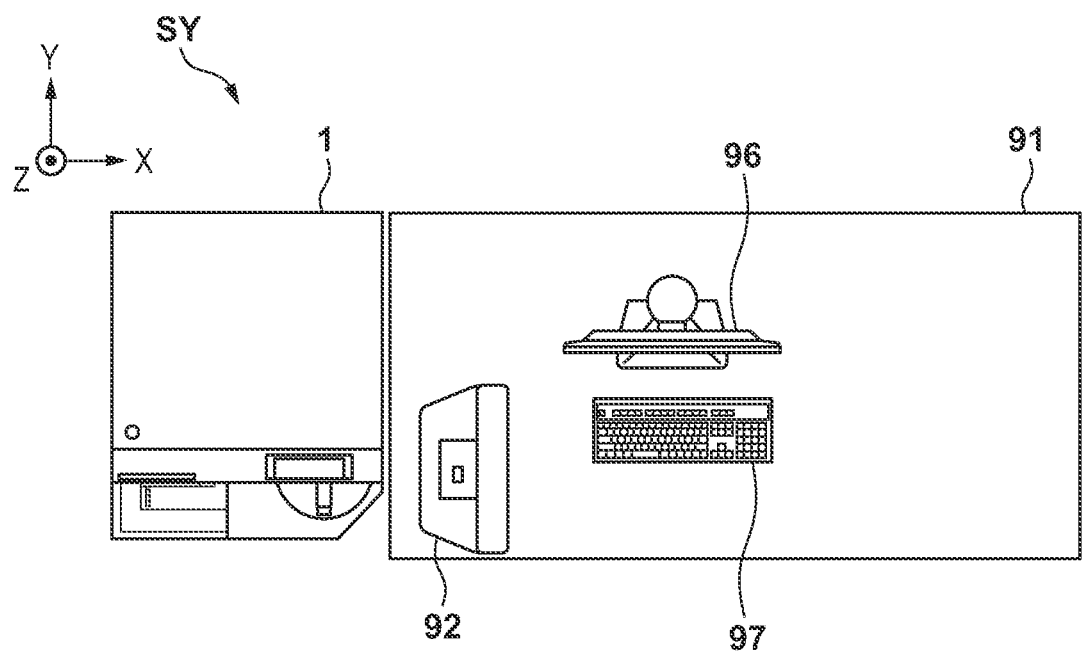
FIG. 2A is a plan view showing an example of the configuration of the sample producing system.
Figure 2B:
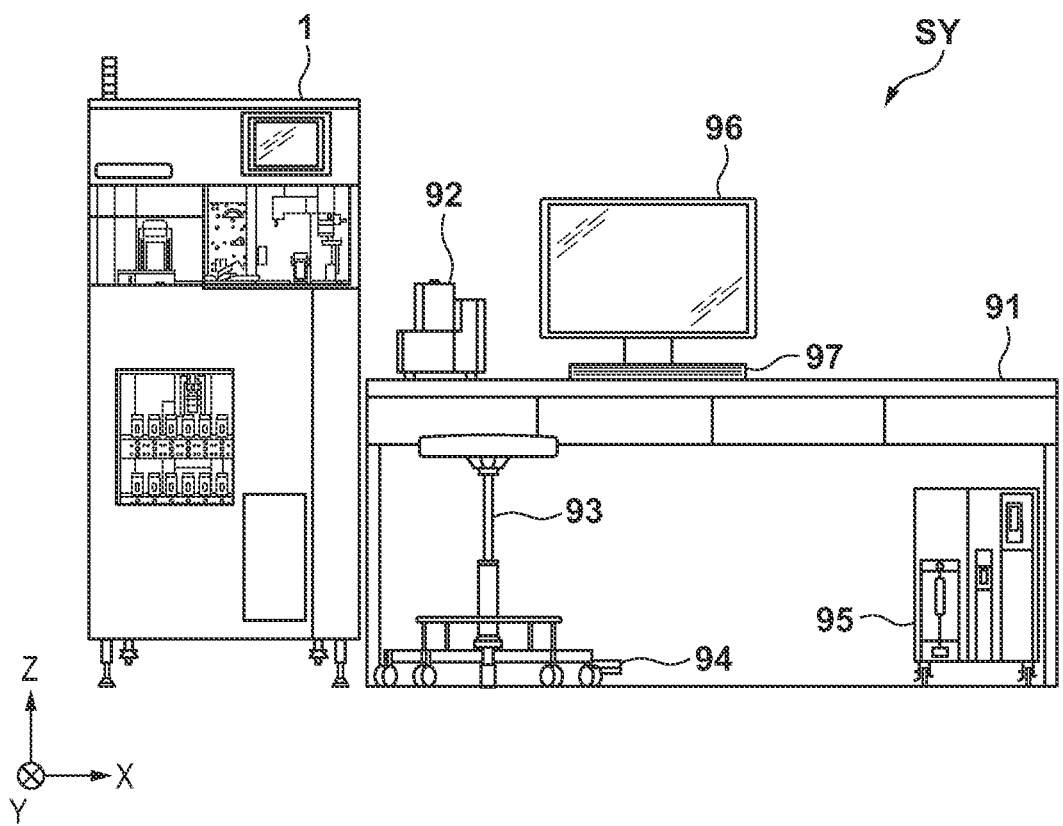
FIG. 2B is a front view showing an example of the configuration of the sample producing system.

FIG. 2A is a plan view of the system SY, and FIG. 2B is a front view of the system SY.

As will be described later in detail, the sample producing apparatus 1 produces a predetermined observation sample using an observation target object imparted by a working subject. Here, the observation target object is a tissue piece that is obtained by slicing a block formed by solidifying, using paraffin or the like, a tissue taken from a subject such as a patient (an observation target object OB to be described later). The observation sample is produced by placing the observation target object on an optically transparent plate (an observation sample SPL to be described later). This plate can also be expressed as a microscope slide, a sample plate, an observation target object placement plate, an optical observation plate, or the like (a plate PL to be described later). In addition, the working subject is a subject that performs a work concerning sample production and is typically an operator such as a technician, or may be a working robot including an imparting mechanism (manipulator or the like) configured to impart an observation target object. In this embodiment, the working subject is "operator", which will simply be referred to as an "operator" hereinafter.

The working table 91 is a desk used by the operator to perform a work associated with production of an observation sample. The observation target object producing device 92, the display terminal 96, and the input terminal 97 are installed on the working table 91. The operator can perform a work (for example, management or recording of information concerning an observation sample) on the working table 91 using these. The operator can also perform another work (for example, for example, a writing work). The sample producing apparatus 1 and the working table 91 are juxtaposed in the X direction. That is, the working table 91 is installed on a side (here, the side in the +X direction) of the sample producing apparatus 1.

In this embodiment, the observation target object producing device 92 is a microtome that produces a tissue piece as an observation target object. As another embodiment, the observation target object producing device 92 may be another device, for example, a medical instrument or an experimental instrument. As will be described later in detail, on the working table 91, the observation target object producing device 92 is installed on the side of the sample producing apparatus 1.

In this embodiment, the chair 93 is a chair with casters. This allows the operator sitting on the chair 93 to easily move between the sample producing apparatus 1 and the working table 91 when performing a work.

In this embodiment, the input device 94 is a foot switch installed under the working table 91. The operator can perform a predetermined operation input by pressing the input device 94 with a foot. The input device 94 is electrically connected to the sample producing apparatus 1 by a cable (not shown), and as will be described later in detail, the sample producing apparatus 1 advances the step of a work in response to a predetermined operation input to the input device 94.

Note that as another embodiment, the input device 94 may wirelessly be connected to the sample producing apparatus 1. As still another embodiment, the input device 94 may be installed on the working table 91. Also, in place of the foot switch, a lever, a joystick, or the like to be operated by a hand or foot of the operator may be employed, or various kinds of motion sensors to be operated by the motion of a head, an eye, a hand, or a foot may be employed. Furthermore, the input device 94 may be an instrument that performs input by recognizing the voice, thinking, or the like of the operator.

The computer 95 is a general-purpose computer and is installed under the working table 91 here. In this case, when the computer 95 is installed on the side opposite to the side of the sample producing apparatus 1, the operator can be prevented from erroneously interfering with the computer 95. As the display terminal 96, a known display such as a liquid crystal display or a monitor is preferably used. As the input terminal 97, a known input operation element such as a keyboard or a mouse is preferably used. The operator can, for example, perform information management concerning the observation sample using the input terminal 97 while visually recognizing information indicating a plate and an observation target object on the display terminal 96.

[Sample Producing Apparatus]

Figure 3:
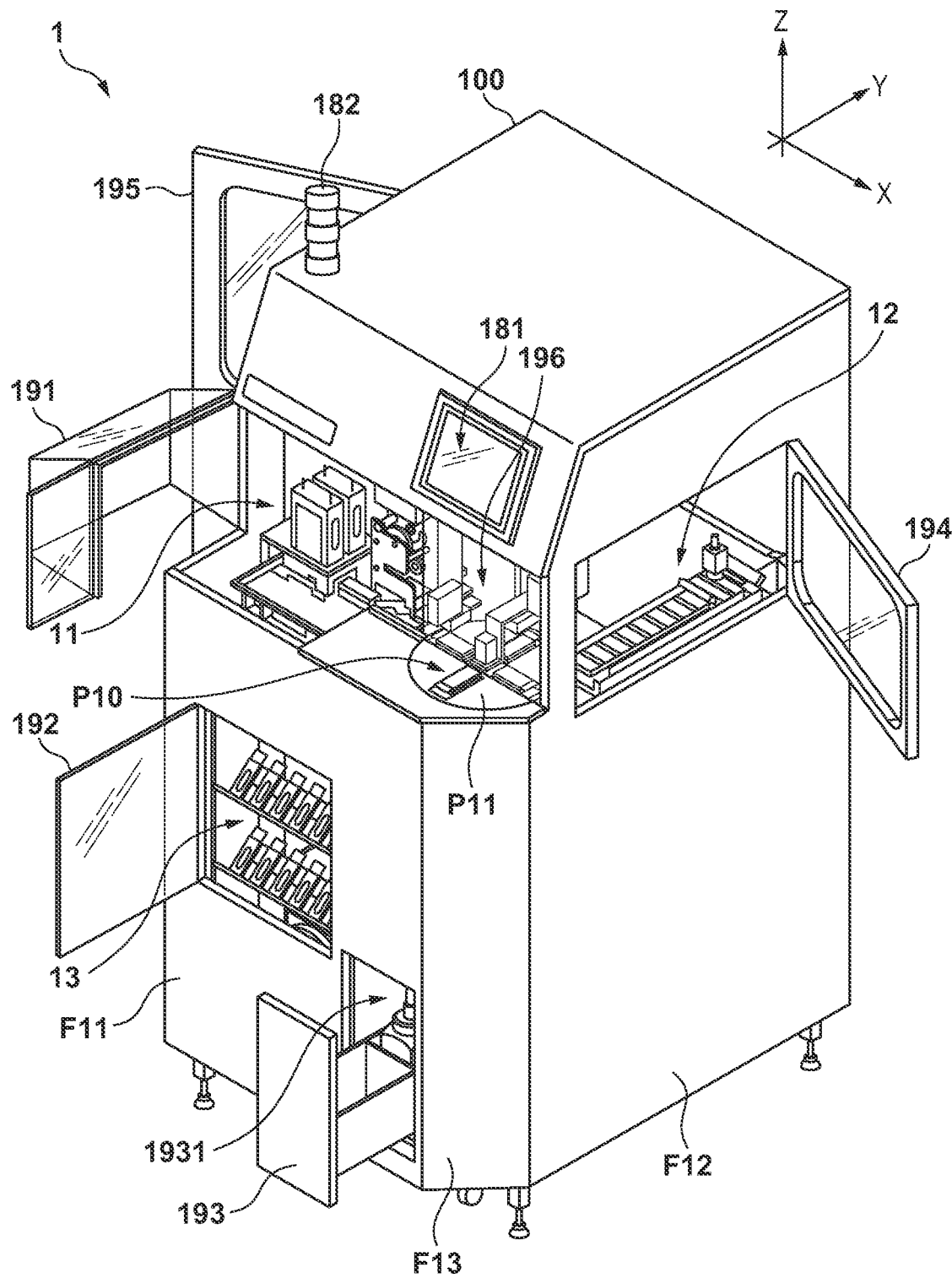
FIG. 3 is a perspective view showing the outer appearance of a sample producing apparatus viewed obliquely from above on the front side.
Figure 4:
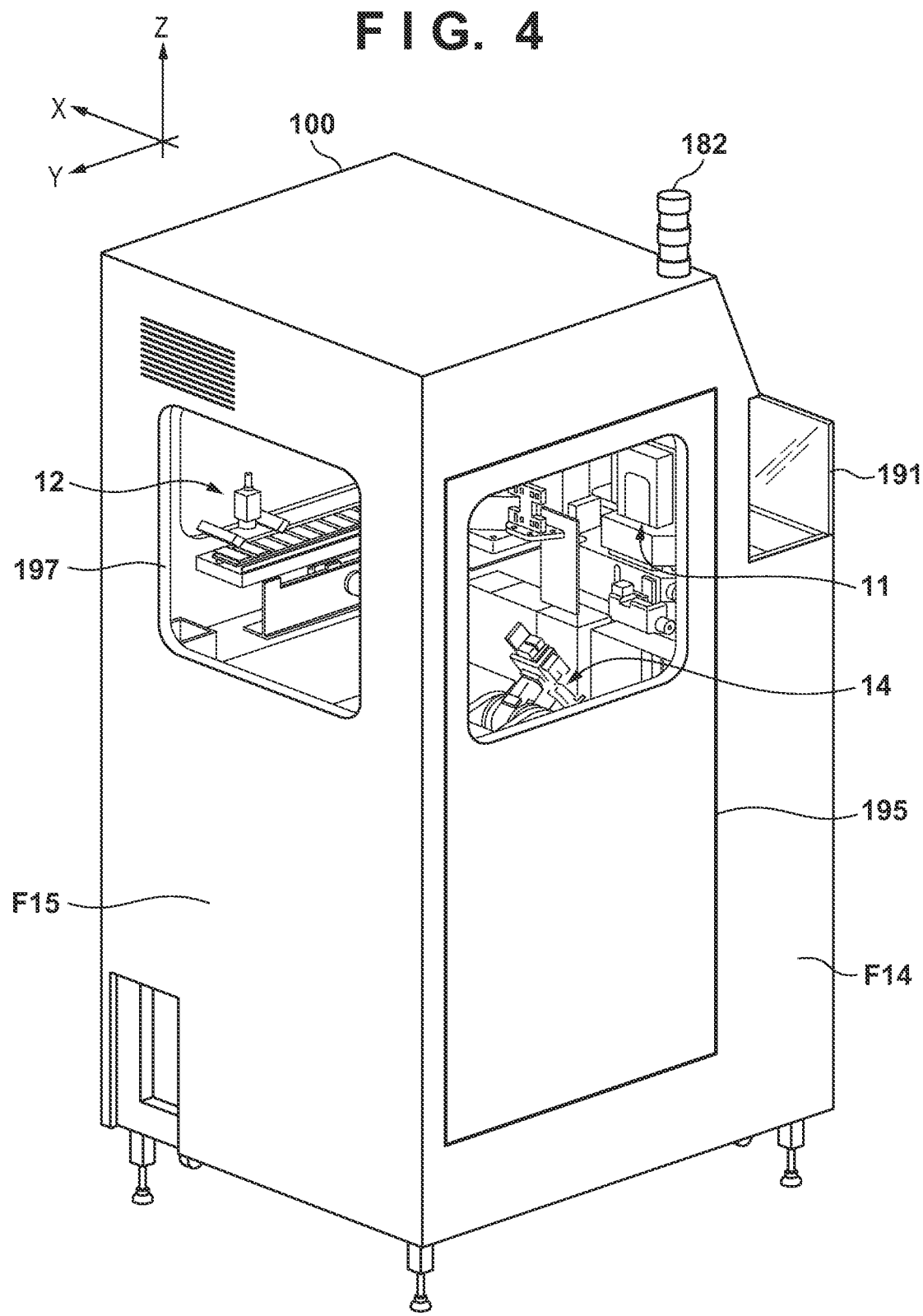
FIG. 4 is a perspective view showing the outer appearance of the sample producing apparatus viewed obliquely from above on the rear side.

FIG. 3 is a perspective view showing the sample producing apparatus 1 viewed obliquely from above on the front side. FIG. 3 shows the sample producing apparatus 1 in a state in which a plurality of opening/closing members are opened. FIG. 4 is a perspective view showing the sample producing apparatus 1 viewed obliquely from above on the rear side. FIG. 4 shows the sample producing apparatus 1 in a state in which a plurality of opening/closing members are closed. The apparatus 1 includes a housing 100 including an exterior panel, and a plurality of units (to be described later) that implement the functions of the apparatus 1 are stored in the housing 100.

The sample producing apparatus 1 further includes elements 191 to 197 attached to parts (F11 and the like to be described later) of the housing 100. As will be individually described later in detail, for example, the front wall portion (front panel) F11 of the housing 100 is provided with the opening/closing member 191, the opening/closing member 192, the storage portion 193, and the plate material 196 as the above-described elements. For example, a side wall portion (side panel) F12 of the housing 100 on the side of the working table 91 is provided with the opening/closing member 194. For example, a side wall portion (side panel) F14 opposite to the side wall portion F12 of the housing 100 is provided with the opening/closing member 195. Also, for example, a rear wall portion (rear panel) F15 of the housing 100 is provided with the window member 197.

As will be described later in detail, a corner wall portion (corner panel) F13 is provided at the corner portion between the front wall portion F11 and the side wall portion F12. The corner wall portion F13 is connected to one end portion (or one edge portion) of the front wall portion F11 and one end portion of the side wall portion F12. That is, the housing 100 has a shape (chamfered shape) chamfered at the corner portion. The above-described wall portions F11 to F15 form the exterior panel of the housing 100. Some or all of these may be molded integrally or separately. Note that the side wall portion F12 corresponds to one side wall portion, and the side wall portion F14 corresponds to the other side wall portion.

The upper front surface of the housing 100 is provided with an operation display panel 181. The operator can confirm the operation state (including a work progress state or the like) of the sample producing apparatus 1 based on display contents displayed on the operation display panel 181. In addition, various kinds of settings of the sample producing apparatus 1 can be input to the operation display panel 181. Examples of the input of various kinds of settings are information input of identification information 1131 to be described later, setting input of a temperature management time in a heating unit 122 to be described later, and temperature setting input in the sample producing apparatus 1. In addition, operations in manually performing the operations of various kinds of units and an automatic driving operation in automatically operating various kinds of units can also be input to the operation display panel 181. Note that as the operation display panel 181, a known touch panel display is used, and the operation display panel 181 may simply be expressed as an operation panel, a display panel, or the like.

Figure 5:
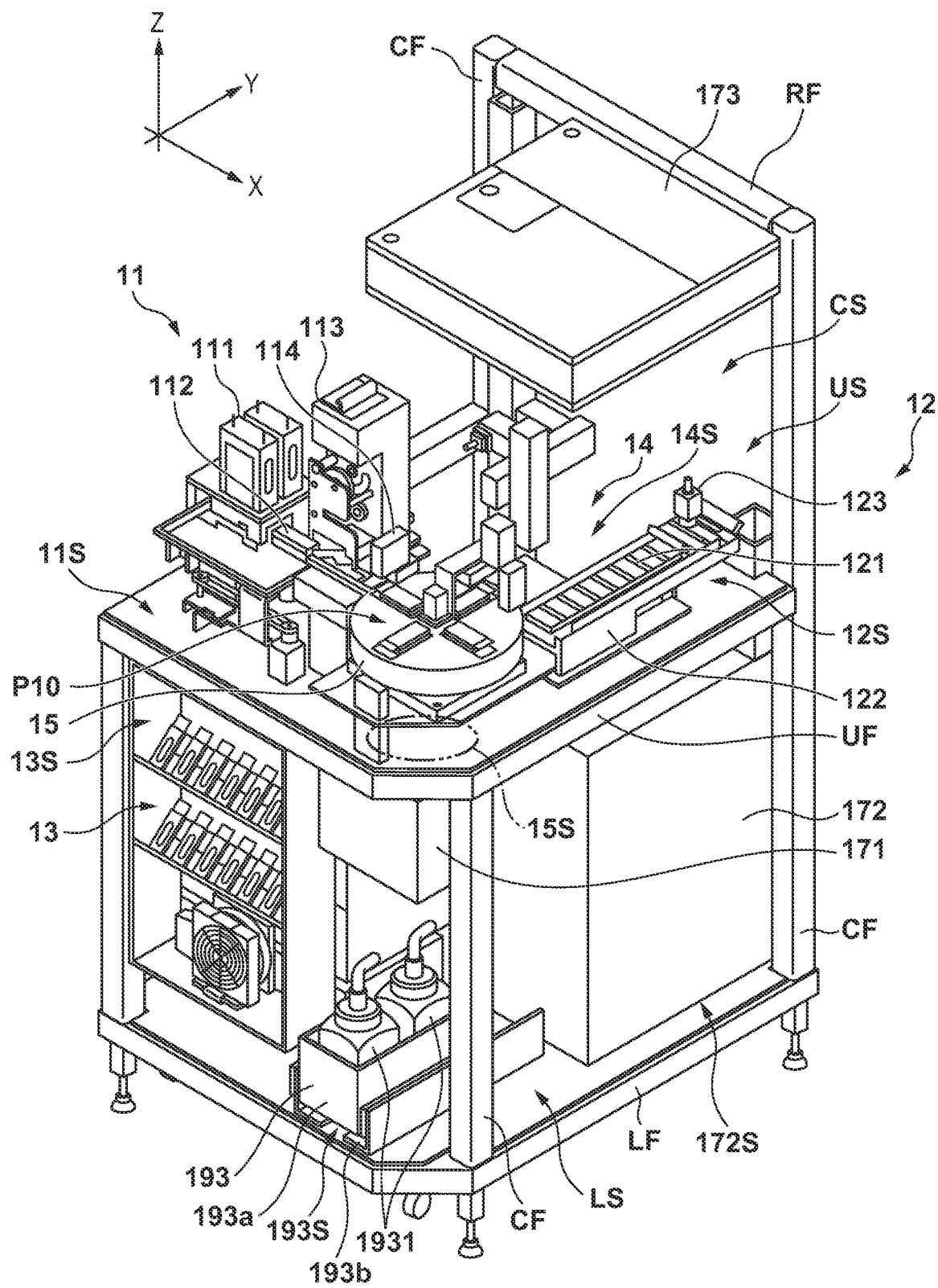
FIG. 5 is a perspective view showing an example of the internal configuration of the sample producing apparatus.

FIG. 5 is a perspective view showing the internal structure of the sample producing apparatus 1. The apparatus 1 further includes a pre-processing portion 11, a post-processing portion 12, a sample storage portion 13, a transfer unit 14, and an observation target object imparting unit 15. As will be described later in detail, the pre-processing portion 11 includes units 111 to 114 configured to perform pre-processing that is processing before impartment of an observation target object. Also, the post-processing portion 12 includes units 121 to 123 configured to perform post-processing that is processing after impartment of an observation target object. The sample storage portion 13 is a unit configured to store (or save or keep) a produced observation sample. The sample storage portion 13 may simply be expressed as a storage portion, or may be expressed as a sample saving portion (or a saving portion simply) or a sample keeping portion (or a keeping portion simply). In this embodiment, the transfer unit 14 is a manipulator capable of gripping a plate. The transfer unit 14 receives a plate with an imparted observation target object from the post-processing portion 12 as the observation sample SPL and transfers it to the sample storage portion 13.

The observation target object imparting unit 15 is a unit that is accessible when the operator imparts an observation target object. The unit 15 is installed at an access point for the operator when imparting the observation target object (an observation target object imparting position or an imparting position P10 simply). The unit 15 may be expressed as a working subject access unit, an observation target object receiving unit, or the like from the viewpoint of receiving the observation target object from the operator.

The sample producing apparatus 1 further includes control units 172 and 173. For example, the control unit 172 performs drive control of the pre-processing portion 11, the unit 15, and the post-processing portion 12, and also performs management control of the entire sample producing apparatus 1. The control unit 173 performs dedicated drive control to drive the transfer unit 14. As another embodiment, some of the functions of a unit (for example, the unit 173) may be implemented by another unit (for example, the unit 172), or some or all of the functions of these may be implemented by a single unit.

Each of the control units 172 and 173 can typically be configured to incorporate a control board on which electronic components such as an ASIC (Application Specific Integrated Circuit) are mounted. However, the present invention is not limited to this configuration. For example, each of the control units 172 and 173 may be configured to include a CPU (Central Processing Unit) and a memory, and the functions thereof may be implemented by executing a program by a computer. That is, the individual functions of the control units 172 and 173 may be implemented by hardware or software.

The above-described elements 191 to 197 are fixed to a frame member or a base, which supports the exterior panel of the housing 100, by fastening using, for example, bolts, screws, and the like. In this embodiment, the housing 100 includes an upper support member UF, a lower support member LF, and connection support members CF. The pre-processing portion 11, the post-processing portion 12, and the unit 15 are arranged on the upper support member UF. The lower support member LF is provided on the lower side with an interval to the upper support member UF. The connection support members CF connect the upper support member UF and the lower support member LF. The housing 100 is defined into an upper space US and a lower space LS as the upper support member UF as the boundary. The upper space US is a space to arrange the pre-processing portion 11, the post-processing portion 12, and the unit 15, and the lower space LS is a space to arrange the sample storage portion 13. In addition, the upper space US and the lower space LS communicate to form a communication space CS. The communication space CS is a transport space for the observation sample SPL to be transported by the transfer unit 14 from the post-processing portion 12 to the sample storage portion 13.

The pre-processing portion 11 and the unit 15 are installed on the side of the front wall portion F11 and almost at the central portion in the Z direction in the housing 100. The housing 100 further includes a pre-processing arrangement portion 11S in which the pre-processing portion 11 is arranged at a predetermined height on the side of the front wall portion F11, and an observation target object imparting arrangement portion 15S in which the unit 15 is arranged. The pre-processing portion 11 is located on the side of the side wall portion F14, and the unit 15 is located on the side of the side wall portion F12. The unit 15 is located close to the corner wall portion F13. Similarly, the pre-processing arrangement portion 11S is provided on the side of the side wall portion F14, the observation target object imparting arrangement portion 15S is provided on the side of the side wall portion F12, and the observation target object imparting arrangement portion 15S is provided at a position close to the corner wall portion F13. In this embodiment, the pre-processing arrangement portion 11S and the observation target object imparting arrangement portion 15S are provided on the upper support member UF.

The post-processing portion 12 is installed on the side of the side wall portion F12 and almost at the central portion in the Z direction and juxtaposed to the unit 15 in the Y direction in the housing 100. The housing 100 further includes a post-processing arrangement portion 12S at a position close to the side wall portion F12. In this embodiment, the post-processing arrangement portion 12S is provided on the lower support member LF. The sample storage portion 13 is installed on the lower side of the pre-processing portion 11 in the housing 100. The housing 100 further includes a sample storage arrangement portion 13S on the lower side of the pre-processing arrangement portion 11S. In this embodiment, the sample storage portion 13 is arranged in the lower space LS, and the sample storage arrangement portion 13S is provided on the upper support member UF.

The control unit 172 is installed on the lower side of the post-processing portion 12 in the housing 100. In addition, the control unit 173 is installed on the upper side in the housing 100. The housing 100 further includes a first control unit arrangement portion 172S in which the control unit 172 is arranged on the lower side of the post-processing arrangement portion 12S. In this embodiment, the first control unit arrangement portion 172S is provided on the lower support member LF. Also, the housing 100 further includes a second control unit arrangement portion 173S in which the control unit 173 installed on the upper side in the housing is arranged. In this embodiment, the second control unit arrangement portion 173S is provided on a connecting member RF disposed between the connection support members CF on the side of the upper space US on the upper side of the upper support member UF.

The transfer unit 14 is installed on the side of the rear wall portion F15 in the housing 100. The transfer unit 14 can pivot about an axis in the Z direction while moving its distal end in the Z direction, and can access both the post-processing portion 12 and the sample storage portion 13 by this installation mode. The housing 100 further includes a transfer unit arrangement portion 14S on the side of the rear wall portion F15. In this embodiment, the transfer unit arrangement portion 14S is provided on the lower support member LF. The distal end of the transfer unit 14 is arranged to be movable across the upper space US, the lower space LS, and the communication space CS.

Also, the storage portion 193 that stores a liquid tank 1931 is further installed on the lower side of the unit 15 in the housing 100. The liquid tank 1931 stores a liquid to be used in production of the observation sample to be described later. The liquid tank 1931 may be expressed as a liquid storage portion (or a storage portion simply), a container, or the like. The storage portion 193 includes a storage member 193a that stores the liquid tank 1931, and a moving mechanism 193b configured to be able to move the storage member 193a between a storage position and an extraction position. The storage member 193a stored in the housing 100 can be extracted by the moving mechanism 193b in the −Y direction, as shown in FIG. 3. This allows the operator to access the liquid tank 1931 stored in the housing 100 (storage member 193a). For example, the operator can extract the storage member 193a, thereby replenishing the liquid in the liquid tank 1931 or exchanging the old liquid tank 1931 stored in the storage member 193a with a new one. In this embodiment, a storage arrangement portion 193S is provided on the lower support member LF.

[Observation Target Object Imparting Unit]

Figure 6:
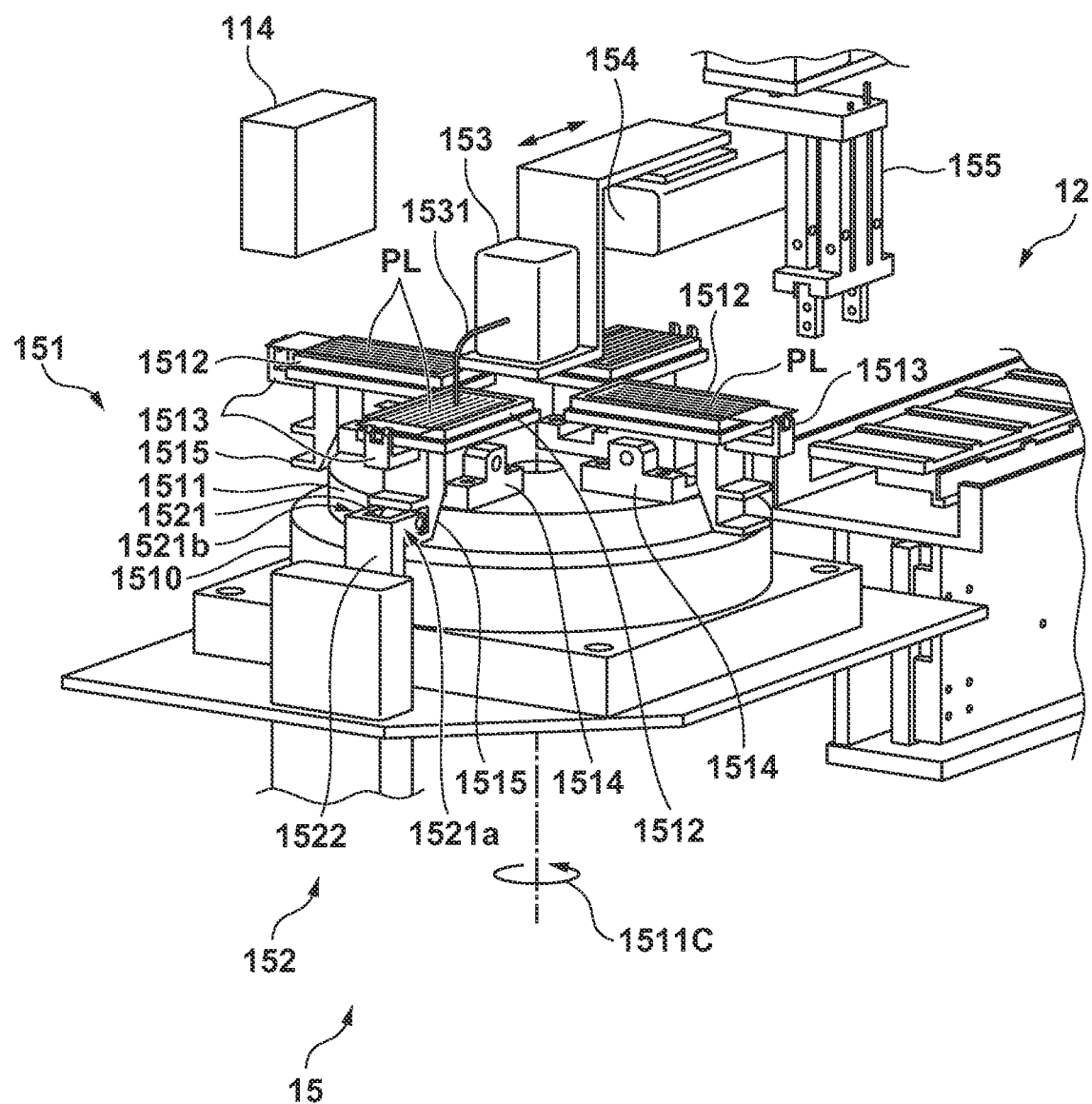
FIG. 6 is a perspective view for explaining each mechanism of an observation target object imparting unit.
Figure 9:
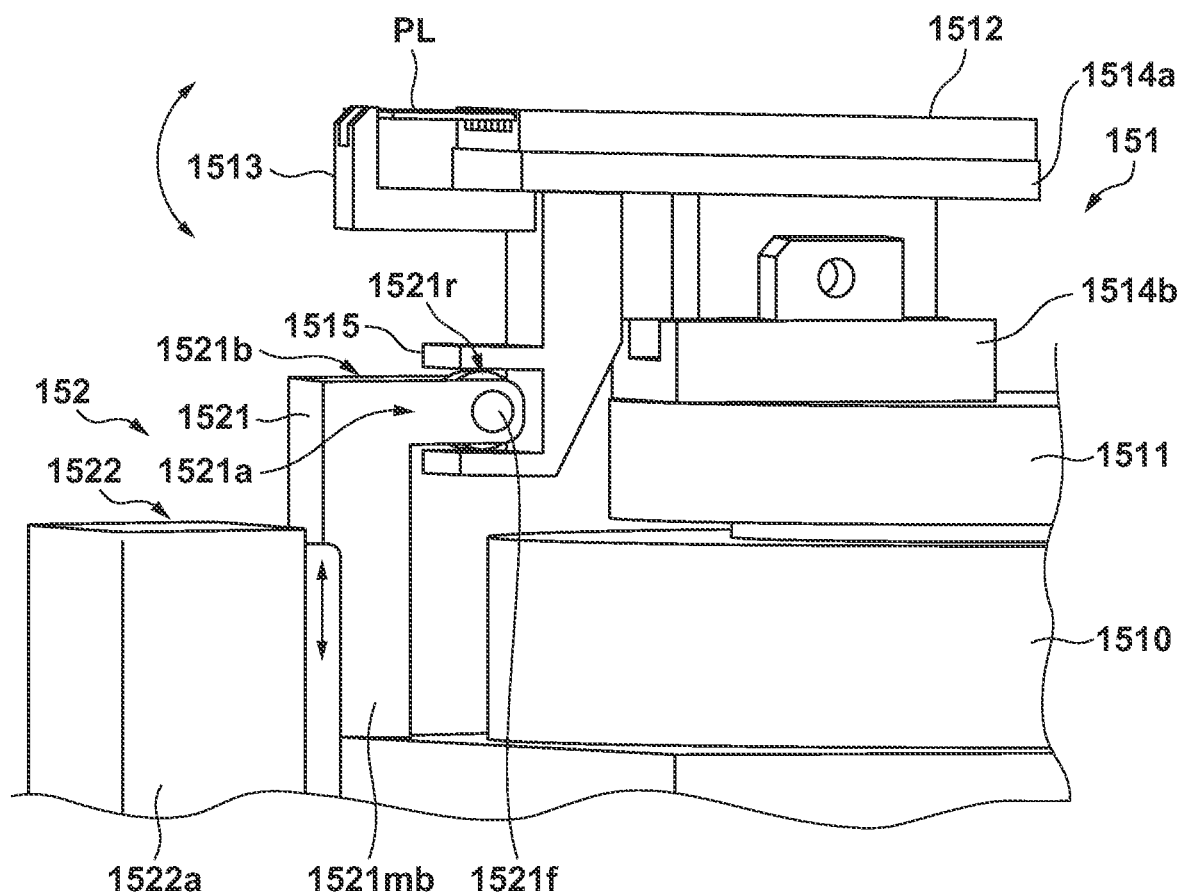
FIG. 9 is a side view for explaining each mechanism of the observation target object imparting unit.

FIG. 6 is a perspective view showing the above-described observation target object imparting unit 15 and the state of the peripheral region thereof. FIG. 9 is an enlarged view showing a part of the unit 15. The unit 15 includes a moving unit 151, a tilting mechanism 152, and a liquid supply unit 153. The unit 15 further includes a transfer unit 155 that transfers the observation sample SPL between the unit 15 and the post-processing portion 12.

The moving unit 151 includes a base 1510, a moving support table (or rotation support table) 1511, a holding portion 1512, and the tilting mechanism 152.

The tilting mechanism 152 includes a tilting fixed body 1514b, a tilting moving body 1514a, an engaging portion 1515, and a lifting mechanism 1522. The tilting fixed body 1514b is supported on the moving support table 1511. The tilting moving body 1514a is supported to be movable with respect to the tilting fixed body 1514b. The engaging portion 1515 is formed on the side of one end portion of the tilting moving body 1514a, and the lifting mechanism 1522 is locked in the engaging portion 1515 and moves the tilting moving body 1514a. The lifting mechanism 1522 includes a moving lock portion 1521 locked in the engaging portion 1515, and a lifting driving portion 1522a that moves the moving lock portion 1521. In this embodiment, a lifting mechanism is employed as a moving mechanism that moves the tilting moving body 1514a. However, for example, a moving mechanism such as a swing mechanism or a cam mechanism capable of reciprocally tilting the tilting moving body 1514a may be employed.

The moving support table 1511 is supported on the base 1510 to be movable (rotatable) in a predetermined direction, and the tilting fixed body 1514b is arranged on its upper surface. In this embodiment, four tilting fixed bodies 1514b are arranged at a predetermined interval, more specifically, at an interval of 90° radially about the rotation shaft of the moving support table 1511. The tilting fixed body 1514b movably (pivotally) supports the tilting moving body 1514a such that one end portion and the other end portion of the tilting moving body 1514a that supports the holding portion 1512 are located at heights different from each other.

As will be described later in detail, the holding portion 1512 is configured to be able to hold the plate PL and attached to the upper portion of the tilting moving body 1514a. In this embodiment, four holding portions 1512 are provided. There may be a single holding portion 1512 or a plurality of holding portions 1512. The four holding portions 1512 are arranged at a predetermined interval about a moving (rotation) axis 1511C of the moving (rotation) support table 1511, which extends in the up-and-down direction, and moved.

The holding engaging portion 1513 is provided for each of the four holding portions 1512, and functions as a fall prevention member that locks the plate PL to prevent the plate PL held by the holding portion 1512 from falling. The holding engaging portion 1513 is provided on the side of the engaging portion 1515 of the tilting moving body 1514a.

The engaging portion 1515 is provided for each of the four holding portions 1512. The engaging portion 1515 is a member formed into an almost C shape with one side opening under the holding portion 1512, and is provided in a posture with the open side directed outward in the radial direction of the base 1510.

The moving lock portion 1521 is a member having an inverted L shape on a side view, and includes a pair of left and right plate portions 1521a and 1521b extending from the upper end of a main body portion 1521mb inward in the radial direction of the base 1510. A fixed shaft 1521f on which a roller 1521r is fitted is provided between the plate portions 1521a and 1521b. The roller 1521r is provided to be rotatable with respect to the fixed shaft 1521f. The roller 1521r engages with one of the four engaging portions 1515 at a predetermined position. More specifically, when the moving support table 1511 pivots, and the engaging portion 1515 is horizontally moved, the engaging portion 1515 is fitted on the moving lock portion 1521 such that the opening portion of the engaging portion 1515 stores (sandwiches) the moving lock portion 1521. Accordingly, the moving lock portion 1521 (roller 1521r) and the engaging portion 1515 engage with each other, and the holding portion 1512 is tiltably supported, as will be described later in detail. In addition, the lifting driving portion 1522a is provided to be connected to the main body portion 1521mb of the moving lock portion 1521.

Here, as described above, the holding portion 1512 is pivotally supported by the tilting moving body 1514a and the tilting fixed body 1514b. For this reason, when the lifting driving portion 1522a is vertically moved (moved up and down) in a state in which the moving lock portion 1521 engages with the engaging portion 1515, the tilting moving body 1514a is made to pivot with respect to the tilting fixed body 1514b, and this tilts the holding portion 1512. In other words, of the four holding portions 1512, only the holding portion 1512 engaging with the moving lock portion 1521 can be tilted by the lifting driving portion 1522a.

Note that a mode in which the engaging portion 1515 stores the moving lock portion 1521 has been exemplified here. As another embodiment, the moving lock portion 1521 and the engaging portion 1515 may be configured such that their functions have a reverse relationship. That is, the moving lock portion 1521 may include a pair of upper and lower plate portions extending from the upper end of the main body portion 1521mb inward in the radial direction of the base 1510, and a roller to be fitted between the pair of upper and lower plate portions may be provided on the side of the engaging portion 1515.

A summary will be made concerning the moving unit 151 and the tilting mechanism 152. When one of the four holding portions 1512 moves to the imparting position P10 along with the rotation of the rotation support table 1511, the engaging portion 1515 corresponding to the holding portion 1512 engages with the moving lock portion 1521. When the moving lock portion 1521 is vertically moved in this state, the holding portion 1512 pivots, that is, the holding portion 1512 and the plate PL held by this can be tilted. With this configuration, the posture of the plate PL can be changed to, for example, a horizontal posture or a tilt posture.

The above-described moving unit 151 can stop the holding portion 1512 and the plate PL held by this at least three positions/regions. First, the moving unit 151 stops the holding portion 1512 in a region where the plate PL is received from the pre-processing portion 11, and the holding portion 1512 is caused to hold the plate PL. Second, the moving unit 151 stops the holding portion 1512 and the plate PL held by this in a region where the operator imparts an observation target object to the plate PL. Third, the moving unit 151 stops the holding portion 1512 and the plate PL held by this in a region where the plate PL to which observation target object is imparted is extracted as an observation sample from the holding portion 1512 by the transfer unit 155 to be described later. Here, the base 1510 incorporates a rotation driving mechanism, and the control unit 172 intermittently drives the rotation support table 1511 such that at least one of the four holding portions 1512 is located in one of the above-described three regions. Details of these will be described later.

The moving unit 151 may be expressed as a conveyance unit, a transport unit, or the like from the viewpoint of sequentially moving the plate PL held by the holding portion 1512 to a predetermined position. In addition, the tilting mechanism 152 may be expressed as a posture change unit, a posture adjustment unit, or the like from the viewpoint of changing the posture of the plate PL.

The liquid supply unit 153 includes a nozzle 1531 capable of discharging a liquid, and a moving mechanism 154 that moves the nozzle 1531 between a liquid supply position and a standby position. The liquid supply unit 153 also includes a supply mechanism (a pump or the like) (not shown) configured to suck a liquid from the liquid tank 1931 and discharge the liquid from the nozzle 1531. Hence, the liquid supply unit 153 can move the nozzle 1531 to the liquid supply position and supply the liquid onto the plate PL held by the holding portion 1512. As will be described later in detail, this can form a liquid pool on the plate PL.

In this embodiment, the moving mechanism 154 is a slide mechanism, and can move the liquid supply unit 153 in the direction of an arrow in FIG. 6. In this embodiment, the moving mechanism 154 moves the liquid supply unit 153 between the position (liquid supply position) to supply the liquid onto the plate PL and a standby position that is also called a home position or the like. For example, when liquid supply is not performed, the moving mechanism 154 causes the liquid supply unit 153 to stand by at the standby position. When executing liquid supply, the moving mechanism 154 moves the liquid supply unit 153 to the liquid supply position such that the nozzle 1531 is located on the plate PL.

In this embodiment, the transfer unit 155 is a manipulator capable of gripping the plate PL. As will be described later in detail, the transfer unit 155 receives the plate PL with the imparted observation target object as an observation sample from the holding portion 1512 and transfers the plate PL to the post-processing portion 12.

Note that as shown in FIG. 5, the sample producing apparatus 1 further includes a storage tank 171. An excess or fallen part of the liquid supplied by the liquid supply unit 153 is guided to the storage tank 171 and stored in the storage tank 171.

[Work Procedure in Sample Producing Apparatus]

Figure 7:
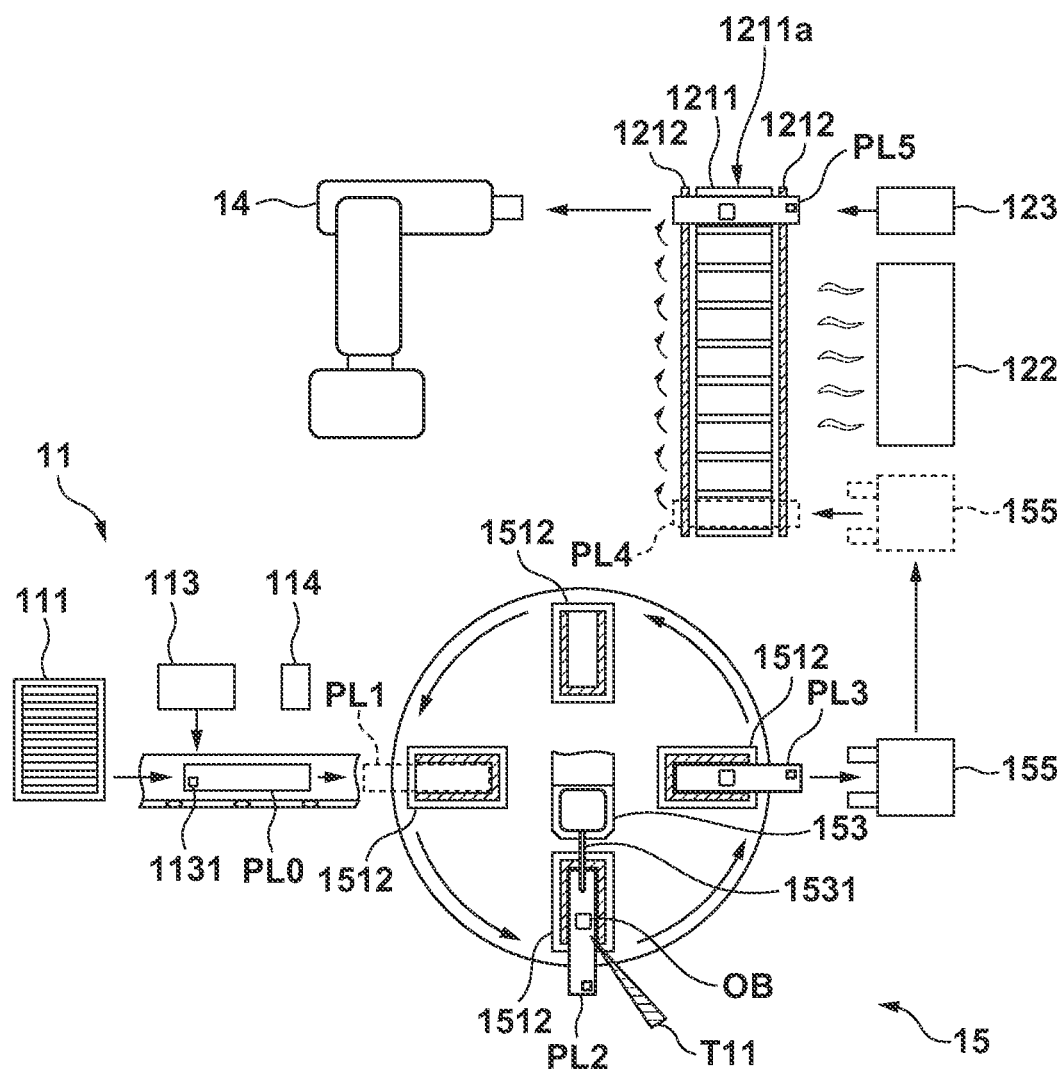
FIG. 7 is a schematic view for explaining an example of work contents in the sample producing apparatus.

FIG. 7 is a schematic view for explaining work contents in the pre-processing portion 11, work contents in the unit 15, and work contents in the post-processing portion 12.

The pre-processing portion 11 includes the plate storage portion 111, the conveyance unit 112, the printing unit 113, and the reading unit 114. The plate storage portion 111 is a magazine (also expressed as a cartridge, a cassette, or the like) that stores the plate PL before the observation target object is imparted, that is, the cleaned or unused plate PL to be used for production of an observation sample. The plate storage portion 111 can store a plurality of plates PL and sequentially send the plurality of plates PL to the conveyance unit 112. In this embodiment, the plurality of plates PL are stacked and stored in the plate storage portion 111. In this embodiment, the conveyance unit 112 is a conveyance belt, and conveys the plates PL sent from the plate storage portion 111 one by one to the unit 15.

In this embodiment, the printing unit 113 is an inkjet printhead, and performs printing on the plate PL that is being conveyed by the conveyance unit 112, thereby imparting, for example, the predetermined identification information 1131.

As the identification information 1131, for example, a two-dimensional code is used, but a character, a number, a symbol, a graphic, or the like may alternatively/additionally be used.

The reading unit 114 can read the identification information 1131 imparted to the plate PL and output the result to the computer 95. The computer 95 can also cause the display terminal 96 to display contents representing the identification information 1131. This makes it possible to associate the identification information 1131 with the (information of) observation target object imparted to the plate PL with the identification information and manage the pieces of information.

Figure 13:
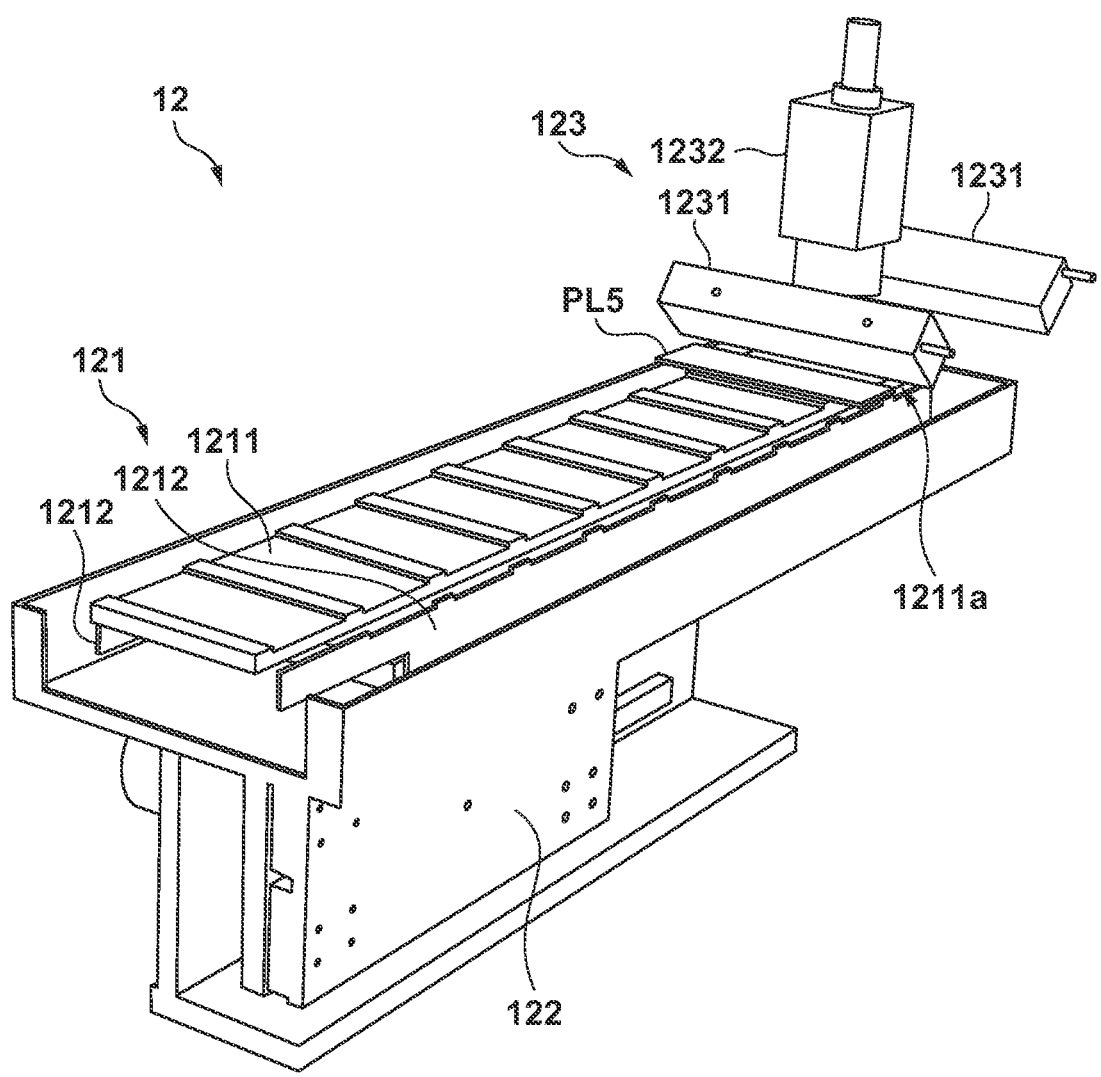
FIG. 13 is a perspective view for explaining an example of the configuration of a post-processing portion.

As shown in FIG. 13 in detail, the post-processing portion 12 includes a transport unit 121, the heating unit 122, and a confirmation unit 123. In this embodiment, the transport unit 121 is a walking beam type transport device, and includes a sample placement portion 1211 and a sample transport mechanism 1212. The sample placement portion 1211 is a long plate material on which a plurality of observation samples can be placed one by one. The sample placement portion 1211 may simply be expressed as a placement portion. Also, the confirmation unit 123 to be described later is arranged at a transport end portion 1211a of the sample placement portion 1211, and the state of the observation sample transported to the transport end portion 1211a is confirmed.

The sample transport mechanism 1212 includes a pair of beam members arranged on both sides of the sample placement portion 1211, and a driving mechanism configured to drive these. When driven by the driving mechanism, the pair of beam members operate in the vertical and horizontal directions simultaneously in parallel. More specifically, ascending of the pair of beam members, movement (feeding operation) in one conveyance direction, descending, and movement (return operation) in the other conveyance direction are continuously performed in this order, and this transports the observation sample on the sample placement portion 1211 intermittently in one direction. The sample transport mechanism 1212 may simply be expressed as a transport mechanism, or may be expressed as a sample conveyance mechanism (or a conveyance mechanism simply), or the like.

The heating unit 122 is installed on the lower side of the transport unit 121, and heats the observation sample that is placed on the sample placement portion 1211 and is being transported by the sample transport mechanism 1212. Accordingly, the observation target object on the plate PL is extended. The heating unit 122 may be expressed as a temperature processing unit or the like, or may be expressed as a temperature processing unit or an observation target object extending unit for the same viewpoint.

The confirmation unit 123 confirms the processed state of the observation sample heated by the heating unit 122. In this embodiment, the confirmation unit 123 includes an illumination device 1231 and an image capturing device 1232. As the illumination device 1231, a known lamp body including an LED or the like as a light source is preferably used. As the image capturing device 1232, a known camera including a CCD/CMOS image sensor is preferably used. The confirmation unit 123 causes the image capturing device 1232 to capture the observation sample while causing the illumination device 1231 to irradiate the observation sample with light, records the image as image information, and associates it with the identification information 1131. The confirmation unit 123 also confirms the processed state of the observation sample and performs predetermined determination. The confirmation unit 123 can also output the results of confirmation and determination to the computer 95. This allows the computer 95 to cause the display terminal 96 to display information representing whether the observation sample is appropriately produced. As another embodiment, the confirmation and determination may be executed by the computer 95.

Work contents in the pre-processing portion 11, the unit 15, and the post-processing portion 12 will be summarized by referring back to FIG. 7. In the pre-processing portion 11, the identification information 1131 is imparted to the plate PL (shown as "plate PL0" for the sake of discrimination) to be conveyed to the unit 15. The unit 15 receives the plate PL from the pre-processing portion 11 (shown as "plate PL1" for the sake of discrimination). After that, the unit 15 moves the plate PL received from the pre-processing portion 11 to a position where the operator imparts (places) an observation target object (observation target object OB) (shown as "plate PL2" for the sake of discrimination).

As will be described later in detail, a liquid is supplied onto the plate PL by the liquid supply unit 153 to form a liquid pool. The operator can place the observation target object OB in the liquid pool on the plate PL using, for example, a tool T11 such as a tweezer. After that, the tilting mechanism 152 tilts the plate PL, thereby removing the liquid pool from the plate PL. Note that a solution or drug liquid having no substantial chemical effect on the observation target object OB is used as the liquid. In this embodiment, pure water is used. As another embodiment, a physiological saline solution or the like may be used.

After that, the unit 15 moves the plate PL with the imparted observation target object OB to a position where the transfer unit 155 can access (shown as "plate PL3" for the sake of discrimination). The transfer unit 155 then extracts the plate PL with the imparted observation target object OB as an observation sample from the unit 15, and transfers it to the transport unit 121 (shown as "plate PL4" for the sake of discrimination). After that, the plate PL is transported in a predetermined direction by the transport unit 121 and simultaneously undergoes heating processing by the heating unit 122, and the observation target object on the plate PL is extended. At the transport end portion of the transport unit 121, the confirmation unit 123 confirms whether the observation sample is appropriately produced (shown as "plate PL5" for the sake of discrimination). The transfer unit 14 extracts, from the transport unit 121, the plate PL and the observation target object OB on it as an observation sample and stores it in the sample storage portion 13.

Note that the timing of driving the unit 15 (for example, the timing of moving the plate PL) can be decided when the operator presses, by a foot, the input device 94 (see FIGS. 1 and 2B) connected to the control unit 172. For example, preferably, after the plate PL from the pre-processing portion 11 is moved by the unit 15 to a predetermined position, the operator imparts the observation target object OB to the plate PL and then presses the input device 94.

Figure 14:
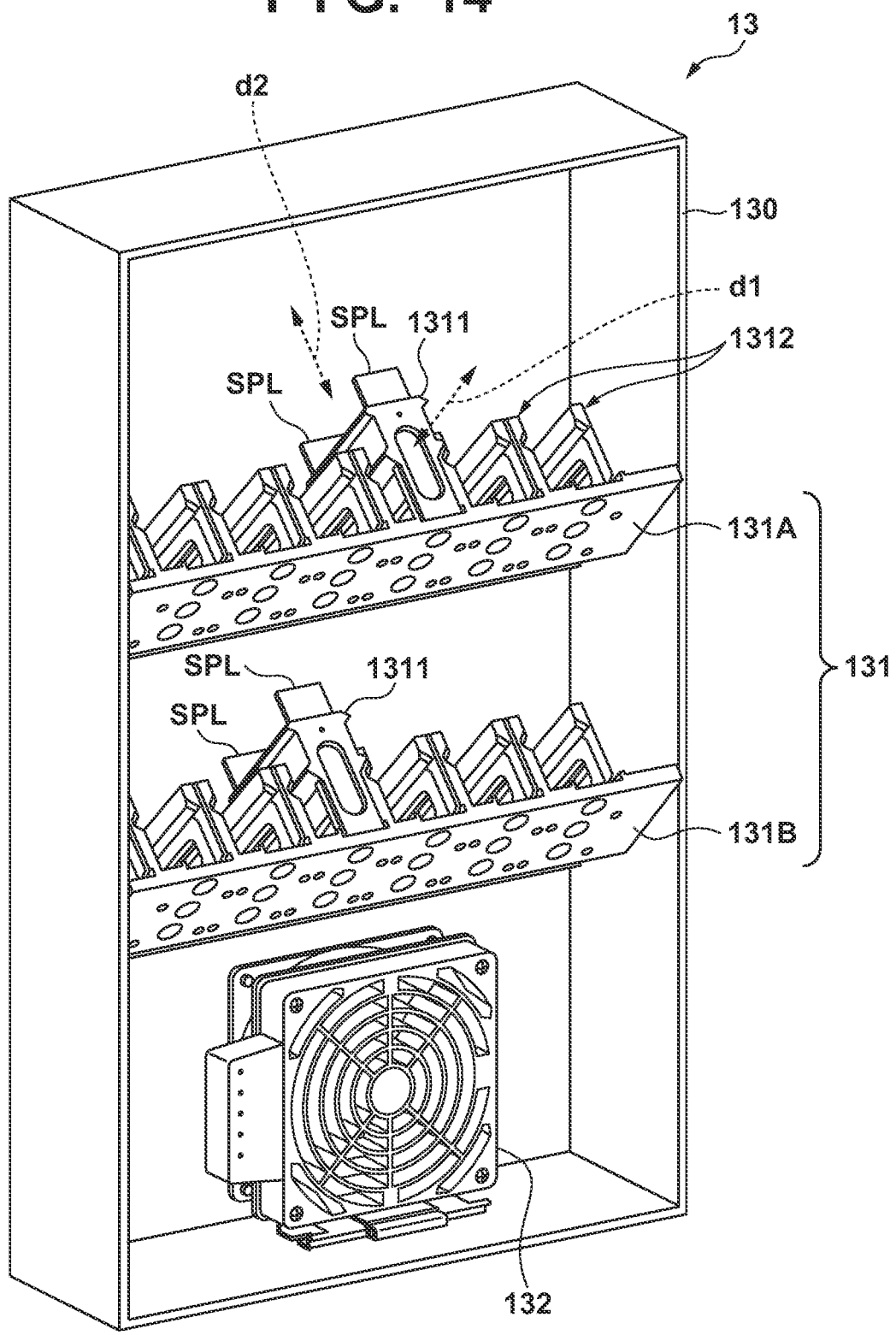
FIG. 14 is a view for explaining an example of the configuration of a sample storage portion.

FIG. 14 is a perspective view showing an example of the configuration of the sample storage portion 13. The sample storage portion 13 includes a frame member 130, an upper plate material 131A, a lower plate material 131B, and an atmosphere adjustment unit 132. The plate materials 131A and 131B are disposed in the frame member 130 while being tilted to a predetermined angle. A rack 131 of two shelves is formed by the plate materials 131A and 131B. In the plate materials 131A and 131B, a plurality of storage portions 1312 are provided at predetermined positions. Each storage portion 1312 is formed by a pair of storage members 1312*a* and 1312*b* provided at a predetermined interval, and permits placement and extraction of a case 1311 in a first tilting direction d1. Using a pair of rack members 1312*a* and 1312*b* as one storage portion 1312, the plurality of storage portions 1312 are provided on the plate materials 131A and 131B.

Since the case 1311 is tilted in the first tilting direction d1 and placed on the storage portion 1312, saving of the observation sample SPL by the transfer unit 14 can be performed from a second tilting direction d2 crossing the first tilting direction d1, and the observation sample SPL can efficiently be stored in the case. In addition, since the tilting direction for placement of the case 1311 on the storage portion 1312 and extraction of the case 1311 from the storage portion 1312 is set to the first tilting direction d1, the handling work of the case 1311 by the operator can be performed easily and efficiently.

Two plate materials, that is, the plate materials 131A and 131B have been exemplified here. However, the number of plate materials (that is, the number of rack shelves) is not limited to this. In addition, in each storage portion 1312 of the plate materials 131A and 131B, one or more cases 1311 capable of saving a set of a predetermined number of observation samples (observation samples SPL) can be saved. This allows the operator to easily manage the plurality of observation samples SPL.

In this embodiment, the atmosphere adjustment unit 132 is a blower installed on the lower side of the plate materials 131A and 131B, and adjusts the atmosphere in the sample storage portion 13 to a desired environment. For example, the atmosphere adjustment unit 132 includes an environment adjustment unit (not shown) capable of maintaining the atmosphere in the sample storage portion 13 at a desired temperature and/or maintaining the atmosphere at a desired humidity. The atmosphere adjustment unit 132 may be expressed as an environment maintaining unit, an environment management unit, an air conditioning unit, or the like.

[Attached Members of Housing]

Referring back to FIGS. 3 and 4, the opening/closing members 191, 192, 194, and 195, the plate material 196, and the window member 197 are attached to the housing 100 such that the operator can visually recognize the inside of the housing 100, and/or the operator can access the inside of the housing 100 as needed. These are partition members configured to partition the inside/outside of the housing 100 together with the housing 100. Note that a notification lamp 182 is provided on the top of the housing 100, and if access to the inside of the housing 100 is necessary, the operator is notified by lighting or blinking of the notification lamp 182.

The opening/closing member 191 is an optically transparent cover openably/closably provided on the upper portion of the front wall portion F11. The operator can access the pre-processing portion 11 by opening the opening/closing member 191 and, for example, replenish plates PL in the plate storage portion 111 or exchange the plate storage portion 111 with a new one.

The opening/closing member 192 is an optically transparent cover openably/closably provided on the front wall portion F11. The operator can access the sample storage portion 13 by opening the opening/closing member 192 and, for example, extract the observation sample SPL by extracting the case 1311 from the sample storage portion 13.

The opening/closing member 194 is a door member openably/closably provided on the side wall portion F12, and is a door member including a window member. The operator can access each element of the post-processing portion 12 by opening the opening/closing member 194 and, for example, remove an observation sample determined by the confirmation unit 123 not to have been appropriately produced.

The opening/closing member 195 is a door member openably/closably provided on the side wall portion F14, and is a door member including a window member. The opening/closing member 195 is provided, on the side wall portion F1, in a size for, for example, including the operation range of the transfer unit 14. When the opening/closing member 195 is opened, maintenance in the housing 100 by the operator can easily be performed. The opening/closing member 195 may be expressed as a maintenance door or the like.

The window member 197 is an optically transparent plate material provided in the rear wall portion F15. The operator can visually recognize the state in the housing 100 from the rear side of the producing apparatus 1 as well.

In this embodiment, the plate material 196 is an optically transparent plate material fixed on the upper portion of the front wall portion F11. The plate material 196 exposes a part of the above-described unit 15 (see FIGS. 6, 9, and 7) as a region (imparting region) that the operator can access to impart the observation target object OB. The imparting position P10 described with reference to FIG. 3 is included in the imparting region.

As is apparent from FIG. 3, a work assisting portion P11 on which the operator can place a portion of an arm or hand is provided near the imparting position P10. Hence, when the operator imparts (places) the observation target object OB to the plate PL at the imparting position P10, a part of the arm or hand of the operator himself/herself can be placed on (brought into contact with) the work assisting portion P11 and fixed (stabilized), and in a stable posture, the observation target object OB can be imparted to the plate PL. Note that in this embodiment, the work assisting portion P11 is the upper side portion of the corner wall portion F13. However, a dedicated member such as an arm rest member may be installed and used.

Here, in the unit 15, the rotation support table 1511 rotates, and one of the four holding portions 1512 thus moves to the imparting position P10. On the other hand, the remaining three holding portions 1512 are located in the housing 100. A predetermined gap is formed on the lower side of the plate material 196 (in this embodiment, between the plate material 196 and the upper surface of the rotation support table 1511), and each holding portion 1512 passes through the gap along with the rotation of the rotation support table 1511.

[Installation Mode of Observation Target Object Imparting Unit and the Like]

As is apparent from FIG. 3, the observation target object imparting unit 15 and the imparting position P10 (a portion of the unit 15 exposed by the plate material 196) are provided close to the corner portion of the housing 100 (on the side of the corner wall portion F13) and set as the imparting region. Here, "close to the corner portion" means "closer than the remaining corner portions". This allows the operator to efficiently perform the work on the sample producing apparatus 1 and the working table 91.

In this embodiment, the distance between the observation target object producing device 92 and (the imparting position P10 of) the unit 15 is short. It is therefore possible to efficiently perform a work of extracting the observation target object OB from the device 92 and transferring it to the unit 15. The distance (height difference) between the unit 15 and the device 92 in the up-and-down direction is preferably short (for example, 50 cm or less, preferably, 30 cm or less, and more preferably, 20 cm or less). When both of these are located on the upper side of the position of the waist of the operator and on the lower side of (below) the shoulders, burdens on the body of the operator can be reduced, and the work can efficiently be performed. Note that the heights of the sample producing apparatus 1 and/or the working table 91 may be adjusted to meet such a condition.

Also, the housing 100 of the sample producing apparatus 1 has a chamfered shape on the corner portion (includes the corner wall portion F13), and this can reduce interference of the feet of the operator with the housing 100. To appropriately implement this, the width of the corner wall portion F13 in the horizontal direction is, for example, about 10 cm, and preferably, about 15 cm or more. In addition, both the first angle (interior angle) between the front wall portion F11 and the corner wall portion F13 the second angle between the side wall portion F12 and the corner wall portion F13 are, for example, about 110 to 160 [degrees], and preferably, about 130 to 140 [degrees].

Also, as can be seen from FIG. 3, in this embodiment, in the corner portion of the housing 100, the corner wall portion F13 is arranged throughout from the upper end portion to the lower end portion to form the chamfered shape. As another embodiment, the chamfered shape may be provided partially (for example, on the upper end portion and the intermediate portion) and is preferably provided on a necessary portion.

[Configuration of Holding Portion]

Figure 8:
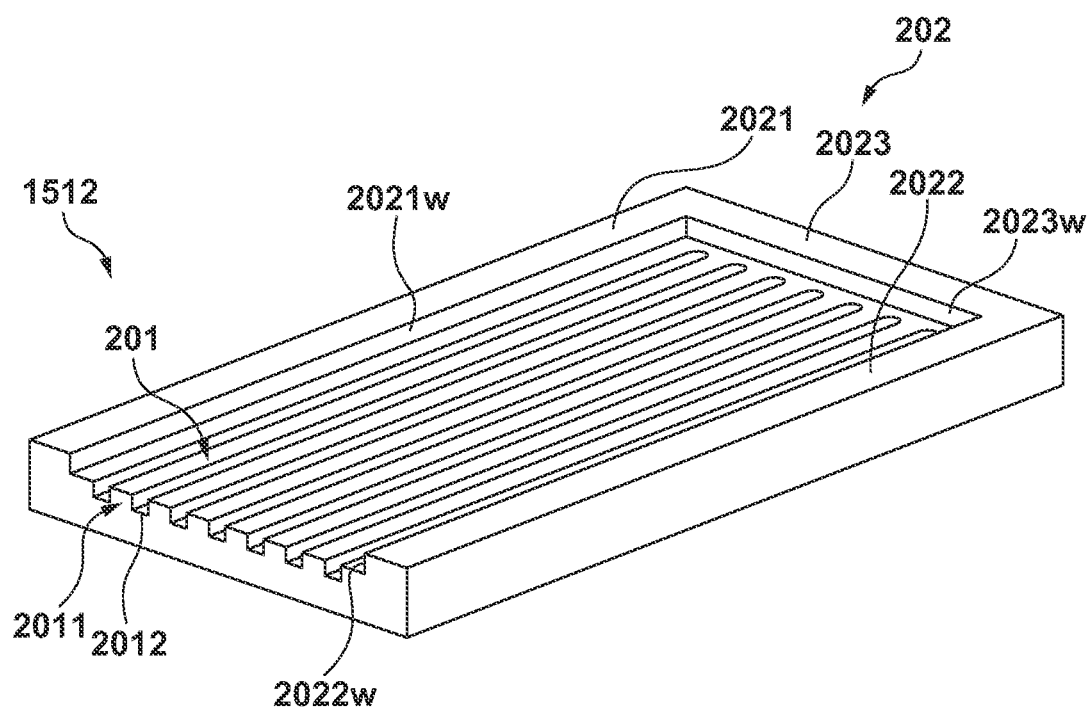
FIG. 8 is a view for explaining an example of the configuration of a placement member.

FIG. 8 is a perspective view showing the structure of the holding portion 1512. The holding portion 1512 includes a placement portion 201 and a wall portion 202. The placement portion 201 is a portion that forms a placement surface configured to place the plate PL, and is preferably made of a material hard to make the plate PL slip and formed in a shape (here, in a long shape) according to the size of the plate PL. The placement surface has a three-dimensional shape. In this embodiment, contact portions (convex portions) 2011 that contact the lower surface of the plate PL and non-contact portions (concave portions) 2012 that do not contact the lower surface of the plate PL are provided alternately in the widthwise direction and in a groove shape along the longitudinal direction. For example, if an excessive liquid is supplied onto the plate PL, the excess portion of the liquid enters the non-contact portions 2012, and adhesion that can be generated by the tensile force of the liquid that has entered between the lower surface of the plate PL and the contact portions (convex portions) 2011 in contact can be reduced.

The wall portion 202 is provided on the three side portions of the placement portion 201, and in this embodiment, includes side wall portions 2021 and 2022 and an end side wall portion 2023. The side wall portions 2021 and 2022 are provided along the longitudinal direction at the two end portions of the placement portion 201 in the widthwise direction. The end side wall portion 2023 is provided along the widthwise direction at one end portions of the placement portion 201 in the longitudinal direction. In this embodiment, the wall portions 2021 to 2023 are connected to each other. That is, the wall portion 202 is integrally molded in an almost U shape such that the three side portions of the placement portion 201 are closed, and the remaining one side portion is opened. In addition, the side wall portions 2021 and 2022 and the end side wall portion 2023 each include a wall surface having a height equal to or more than the thickness of the plate PL and extending upward from the placement surface of the contact portions 2011. That is, the inner peripheral surface is formed by a side wall surface 2021w included in the side wall portion 2021, a side wall surface 2022w included in the side wall portion 2022, and a side wall surface 2023w included in the end side wall portion 2023. With this configuration, if the plate PL is placed on the placement portion 201, the wall portion 202 surrounds three sides of the plate PL. The wall portion 202 may be expressed as a frame portion or the like.

The wall portion 202 includes a lyophobic portion (a liquid-repellent portion with liquid repellency) having a lyophobic property at least on the surface. That is, at least the surface of the wall portion 202 is made of a lyophobic material that is hard to fit with a liquid, or the wall portion 202 is surface-treated with a material having a lyophobic property. For example, if water is used as the liquid, a silicone resin or a fluororesin having hydrophobicity or water-repellency is used. The lyophobic property is a relative property indicating a property to a liquid on an upper surface, and can typically be decided based on whether the contact angle of a droplet on the upper surface satisfies a predetermined condition. For example, let $\theta_W$ be the contact angle of a droplet. If, for example, $45°<\theta_W$, or preferably, $60°<\theta_W$ is satisfied, it may be decided that a material has a lyophobic property.

Note that in this embodiment, the placement portion 201 and the wall portion 202 are integrally molded. As another embodiment, the whole or a part of the wall portion 202 may be configured as a separate member attachable to the placement portion 201. In addition, a member that has undergone a lyophobic treatment may be arranged on the upper portion of the wall portion 202.

With this configuration, the holding portion 1512 appropriately holds the plate PL placed on the placement portion 201 while surrounding it by the wall portion 202. The holding portion 1512 may be expressed as a plate placement member (or a placement member simply), a base plate, or a jig for observation sample production. If a liquid is supplied onto the plate PL by the liquid supply unit 153, the liquid is retained on the plate PL while forming a liquid surface higher than the upper surface of the wall portion 202 by the lyophobic portion of the wall portion 202, and a liquid pool is thus appropriately formed on the plate PL. In addition, if the holding portion 1512 and the plate PL are tilted by the tilting mechanism 152 to the open side of the wall portion 202 (the side where the wall portion 202 is not provided or the side opposite to the end side wall portion 2023), the liquid of the liquid pool flows to the open side of the wall portion 202 having an almost U shape and is discharged, and the liquid pool is removed from the plate PL.

[Mode of Imparting Observation Target Object onto Plate]

Figure 10:
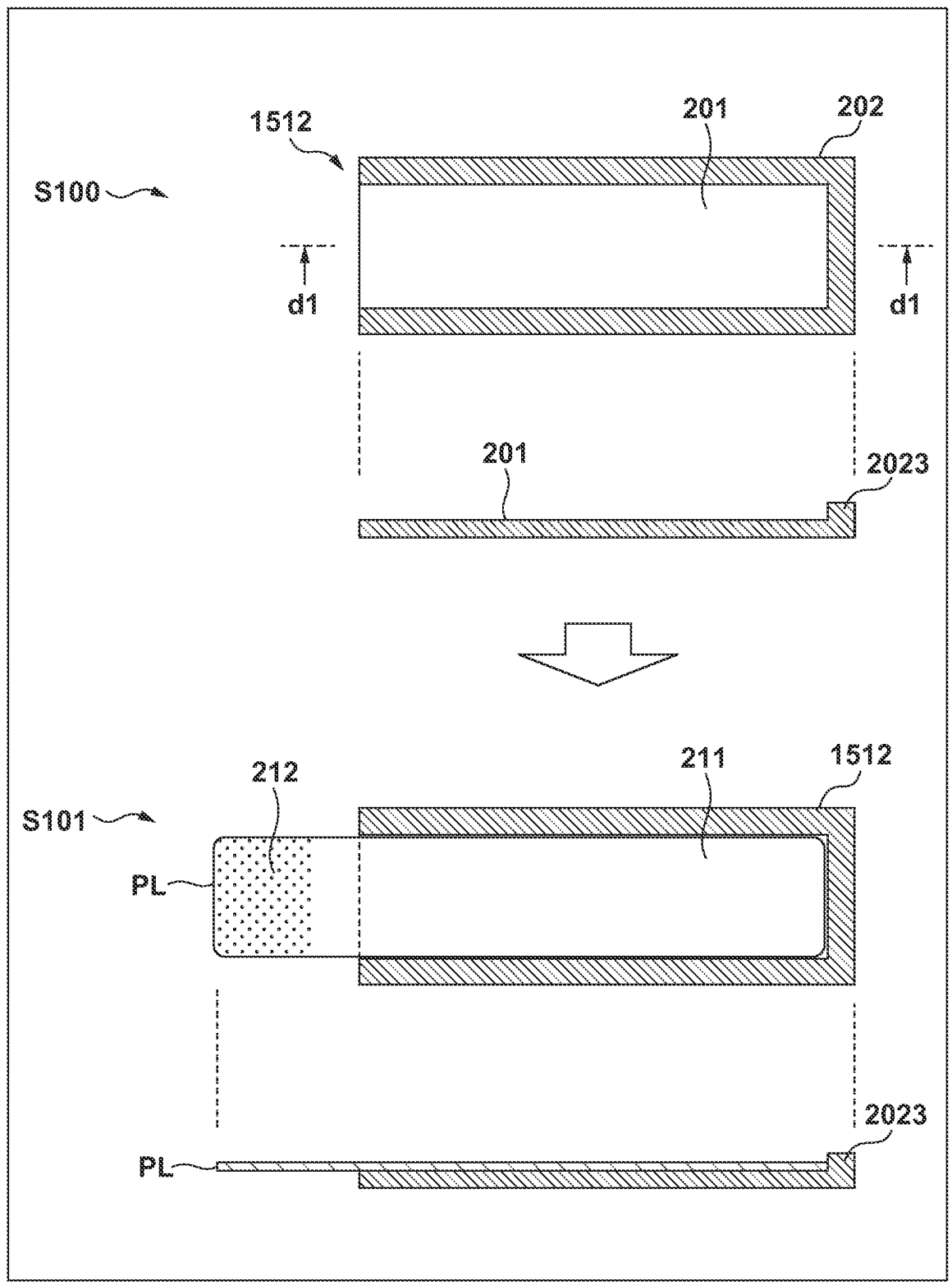
FIG. 10 is a schematic view for explaining an example of an observation sample producing method.

FIG. 10 shows, side by side, a plan view showing the configuration of the holding portion 1512 and a sectional view taken along a line d1-d1 shown at almost the intermediate position of the plan view (to be simply referred to as a "sectional view" hereinafter, and this also applies to the other sectional views in this embodiment). A state S100 shows a plan view and a sectional view showing a state before the plate PL is arranged on the holding portion 1512 (the state of only the holding portion 1512). A state S101 shows a plan view and a sectional view showing a state after the plate PL is arranged on the holding portion 1512. In this embodiment, the plate PL includes a placement portion 211 on which the observation target object OB should be placed, and a frosted portion 212 on which the identification information 1131 can be printed.

As described above, when the plate PL is tilted by the tilting mechanism 152, the liquid of the liquid pool can be discharged from the open side of the wall portion 202 having an almost U shape, and the liquid pool can thus be removed from the plate PL. That is, one end portion of the plate PL on the open side of the wall portion 202 corresponds to an end portion (liquid discharge downstream side end portion) on the downstream side of a direction (moving direction) in which the liquid flows when discharging the liquid, and the other end portion on the opposite side (the side of the end side wall portion 2023) corresponds to an end portion (liquid discharge upstream side end portion) on the upstream side. From this viewpoint, the end portion of the holding portion 1512 on the open side of the wall portion 202 may be expressed as a liquid discharge portion or the like.

Figure 11:
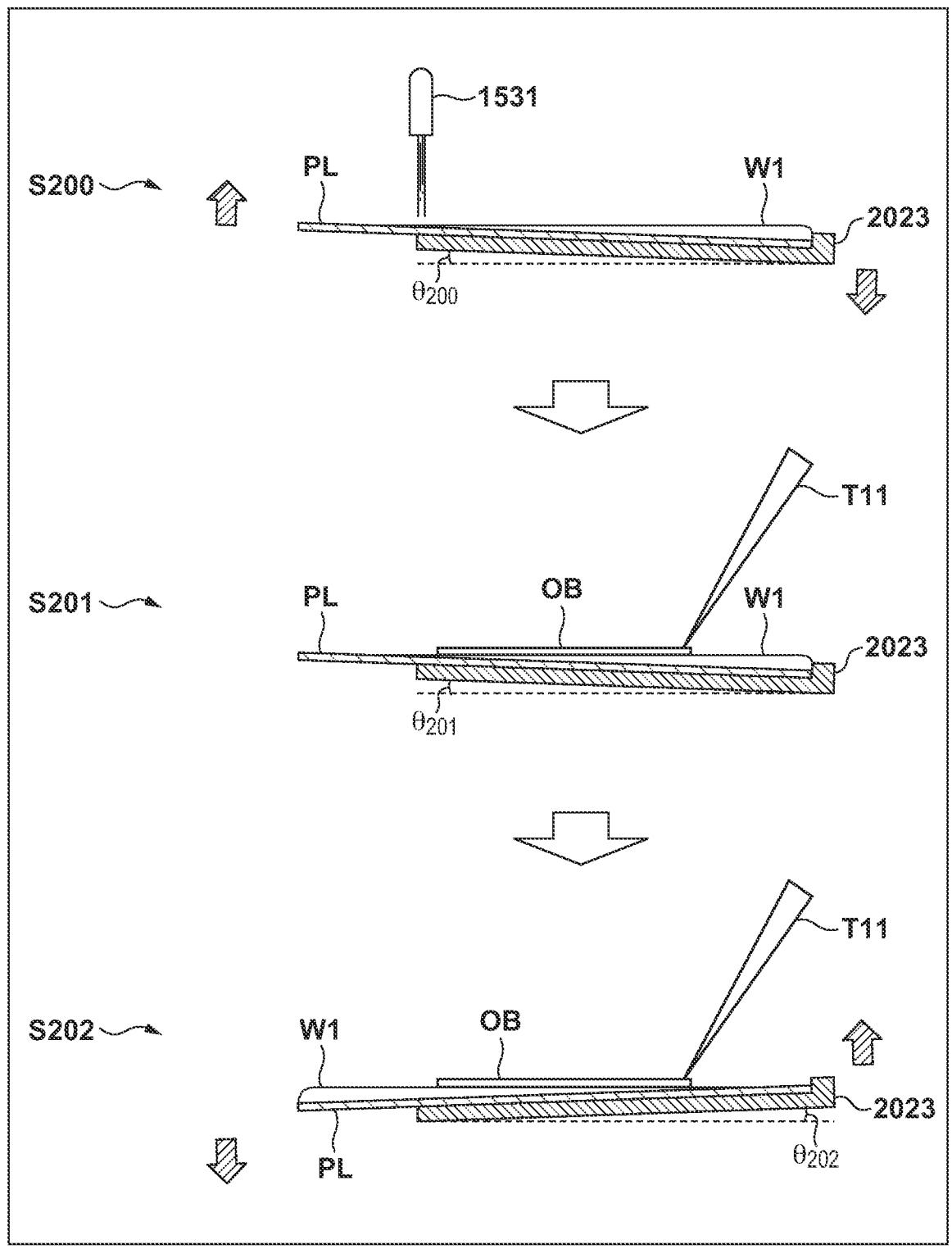
FIG. 11 is a schematic view for explaining an example of an observation sample producing method.

FIG. 11 is a sectional view showing each step of production of the observation sample SPL in the unit 15. The method of producing the observation sample SPL is roughly divided into a step of forming a liquid pool W1 on the plate PL held by the holding portion 1512, a step of placing the observation target object OB on the liquid pool W1, and a step of fixing the observation target object OB to the plate PL while removing the liquid pool W1.

A state S200 shows a sectional view showing a step of tilting the plate PL together with the holding portion 1512 and then supplying a liquid onto the plate PL. First, the holding portion 1512 and the plate PL in a horizontal posture are tilted in a first direction indicated by arrows and set in a first tilt posture. Accordingly, the other end portion of the plate PL on the side of the end side wall portion 2023 becomes lower than the one end portion on the open side of the wall portion 202. The tilt angle (the angle made by the surface (upper surface) of the plate 1 and the horizontal plane: $\theta_{200}$) at this time is preferably set to about 0.5 to 5 [degrees], and in this embodiment, set to about 1 [degree].

Next, a liquid is supplied onto the plate PL in the state S200 by the nozzle 1531 (of the liquid supply unit 153). As described above, the holding portion 1512 includes the wall portion 202 having a lyophobic property. For this reason, on the plate PL in the tilt posture at the tilt angle $\theta_{200}$, the supplied liquid is blocked by the wall portion 202 and appropriately retained on the plate PL, and the liquid pool W1 is thus formed on the plate PL. More specifically, the supplied liquid is repelled by the lyophobic effect of the wall portion 202 and retained on the plate PL, and the liquid pool W1 is formed such that its surface (the surface on which the observation target object OB is placed later) is located on the upper side of the upper surface of the wall portion 202. The depth (liquid depth) of the liquid of the liquid pool W1 is deeper on the other end portion side that is the side of the end side wall portion 2023 than on the one end portion side that is the open side of the wall portion 202.

A state S201 shows a sectional view showing the step of placing the observation target object OB on the liquid pool W1. The operator places the observation target object OB on the liquid pool W1 using the tool T11. As described above, the liquid depth of the liquid pool W1 is deeper on the other end portion side that is the side of the end side wall portion 2023 than on the one end portion side that is the open side of the wall portion 202. As will be described later in detail, at this stage, the operator preferably holds the observation target object OB by the tool T11 by pressing the observation target object against the liquid pool W1 such that its position does not vary. Note that the tilt angle in the state S201 is shown as a tilt angle $\theta_{201}$ ($=\theta_{200}$).

A state S202 shows a sectional view showing a step of tilting the plate PL with the observation target object OB placed on the liquid pool W1 in a second direction opposite to the above-described state S201 to set the plate PL in a second tilt posture (shown as a tilt angle $\theta_{202}$) and starting discharge of the liquid of the liquid pool W1. This guides the liquid of the liquid pool W1 to the one end portion side that is the open side of the wall portion 202.

Here, in the state S202, the liquid depth of the liquid pool W1 is shallower on the other end portion side that is the side of the end side wall portion 2023 than on the one end portion side that is the open side of the wall portion 202. For this reason, the observation target object OB is placed close to the surface of the plate PL at least from the other end portion side, and can therefore directly contact the surface of the plate PL on the other end portion side.

Figure 12:
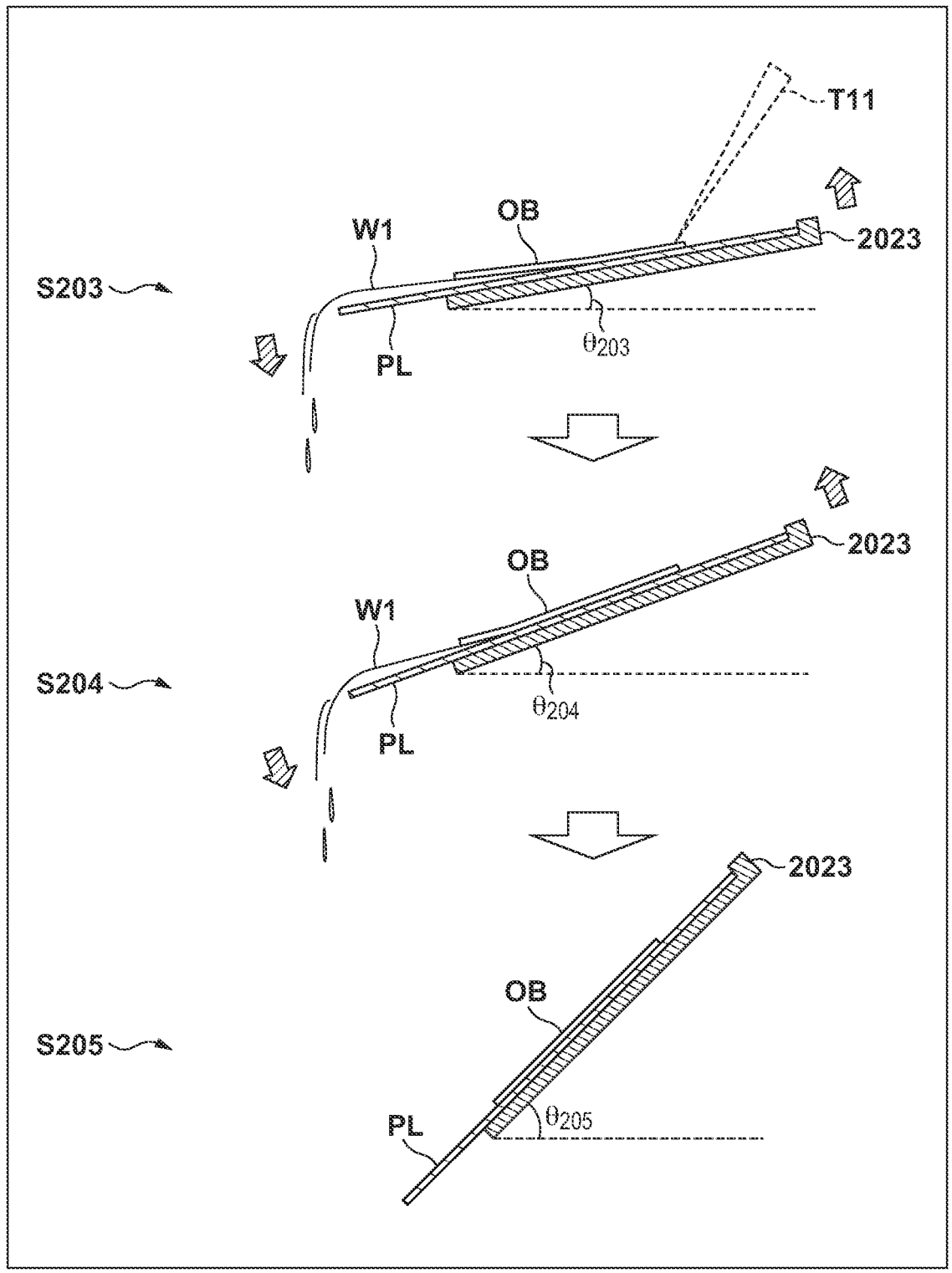
FIG. 12 is a schematic view for explaining an example of an observation sample producing method.

FIG. 12 is a sectional view showing steps of further tilting the plate PL in the second direction to promote the discharge of the liquid of the liquid pool W1 on the plate PL until completion.

In a state S203, the tilt angle of the plate PL is further increased (a tilt posture steeper than the second tilt posture is set) to obtain a third tilt posture (shown as a tilt angle $\theta_{203}$ ($>\theta_{202}$)). In the state S203, the liquid height level of the liquid lowers (the liquid moves to the open side of the wall portion 202) along with the discharge of the liquid of the liquid pool W1. Hence, the observation target object OB on the liquid pool W1 directly contacts the surface of the plate PL on the other end portion side (the side of the end side wall portion 2023), and/or the contact area becomes large. On the other hand, on the one end portion side (the open side of the wall portion 202), the observation target object OB is still located on the liquid pool W1.

Note that in the state 203 (or in the above-described state 202), since the observation target object OB is partially fixed to the plate surface at least on the liquid discharge upstream side, the operator may release the tool T11 from the observation target object OB.

In a state S204, the tilt angle of the plate PL is further increased (a tilt posture steeper than the third tilt posture is set) to obtain a fourth tilt posture (shown as a tilt angle $\theta_{204}$ ($>\theta_{203}$)). In the state S204, the area of contact between the observation target object OB on the liquid pool W1 and the surface of the plate PL becomes larger. Accordingly, the observation target object OB can be attached to the surface of the plate PL without causing wrinkles or twists in the observation target object OB.

In a state S205, the tilt angle of the plate PL is further increased (a tilt posture steeper than the fourth tilt posture is set) to obtain a fifth tilt posture (shown as a tilt angle $\theta_{205}$ ($>\theta_{204}$)). In the state S205, the discharge of the liquid of the liquid pool W1 is completed, and the whole observation target object OB is attached to the surface of the plate PL, thereby producing the observation sample SPL. The tilt angle $\theta_{205}$ is, for example, about 40 to 60 [degrees] and is about 55 [degrees] in this embodiment.

As a summary, according to the steps of the states S200 to S205, the observation target object OB is continuously attached to the surface of the plate PL from the other end portion side (the side of the end side wall portion 2023) to the one end portion side (the open side of the wall portion 202) along with the discharge of the liquid spreading on the surface of the plate PL (flow-out of the liquid from between the observation target object OB and the surface of the plate PL). That is, after the observation target object OB is partially brought into contact with the surface of the plate PL on the liquid discharge upstream side, the observation target object OB contacts the surface of the plate PL sequentially from the liquid discharge upstream side to the liquid discharge downstream side. This makes it possible to finally fix the observation target object OB to the surface of the plate PL. Hence, according to this embodiment, on the plate PL, the observation target object OB is set in a state in which wrinkles and twists are eliminated/a state easy to observe, and the observation sample SPL can appropriately be produced.

Summary of First Embodiment

As described above, according to this embodiment, the holding portions 1512 capable of holding the plate PL are provided on the tilting moving body 1514a. With this configuration, the posture of the plate PL can be changed (set to, for example, a horizontal posture or a tilt posture), and the liquid of the liquid pool W1 on the plate PL can be flowed and appropriately discharged. According to this, the liquid pool W1 is appropriately removed from the plate PL, the observation target object OB is appropriately gradually fixed to the surface of the plate PL from one side and the observation sample SPL is appropriately produced. Hence, according to this embodiment, it is advantageous in improving the working efficiency when producing the observation sample SPL.

Also, in the sample producing system SY, the imparting region where the working subject (here, the operator) accesses the plate PL and imparts the observation target object OB is provided at the corner portion of the housing 100. In this embodiment, the imparting region is a region set on the upper portion of the corner wall portion F13 and including the imparting position P10. The control unit 172 controls the moving unit 151 to move the holding portion 1512 and the plate PL from the supply position of the plate PL from the pre-processing portion 11 to the holding portion 1512 to the imparting position P10 in the imparting region. Hence, according to this embodiment, since the working subject can appropriately access the plate PL, it can be said, in this viewpoint as well, that it is more advantageous in improving the working efficiency when producing the observation sample SPL.

Note that after that, the control unit 172 controls the moving unit 151 to move the holding portion 1512 and the plate PL from the imparting position P10 in the imparting region to the position where the transfer unit 155 extracts the plate PL with the imparted observation target object OB. Also, according to the installation mode of the unit 15 (see FIG. 3), it can be said that the plate material 196 partitions the pre-processing portion 11 and the post-processing portion 12 into the inside of the housing 100 and the outside of the housing 100.

Second Embodiment

In the above-described first embodiment, a mode in which the liquid pool W1 on the plate PL in the unit 15 is flowed, discharged, and removed by tilting the plate PL has been exemplified. However, the method of removing the liquid pool W1 is not limited to this.

Figure 15:
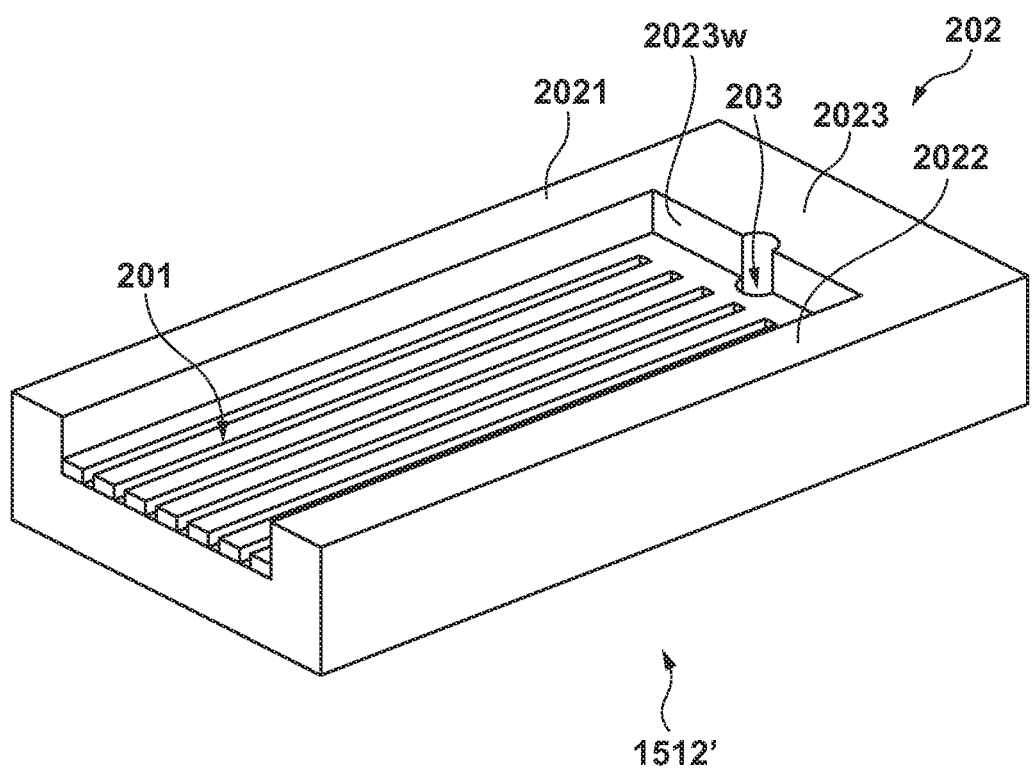
FIG. 15 is a view for explaining another example of the configuration of the placement member.

FIG. 15 is a perspective view showing the structure of a holding portion 1512' according to the second embodiment. The holding portion 1512' includes a placement portion 201, a wall portion 202, and a hole portion 203. The hole portion 203 is an opening portion provided at the boundary portion between the placement portion 201 and an end side wall portion 2023 so as to extend through the placement portion 201. Also, a part of the hole portion 203 is formed, in a side wall surface 2023w' of the end side wall portion 2023, continuously up to the upper surface of the end side wall portion 2023. The other contents are the same as those of the above-described holding portion 1512 (see the first embodiment).

Figure 16:
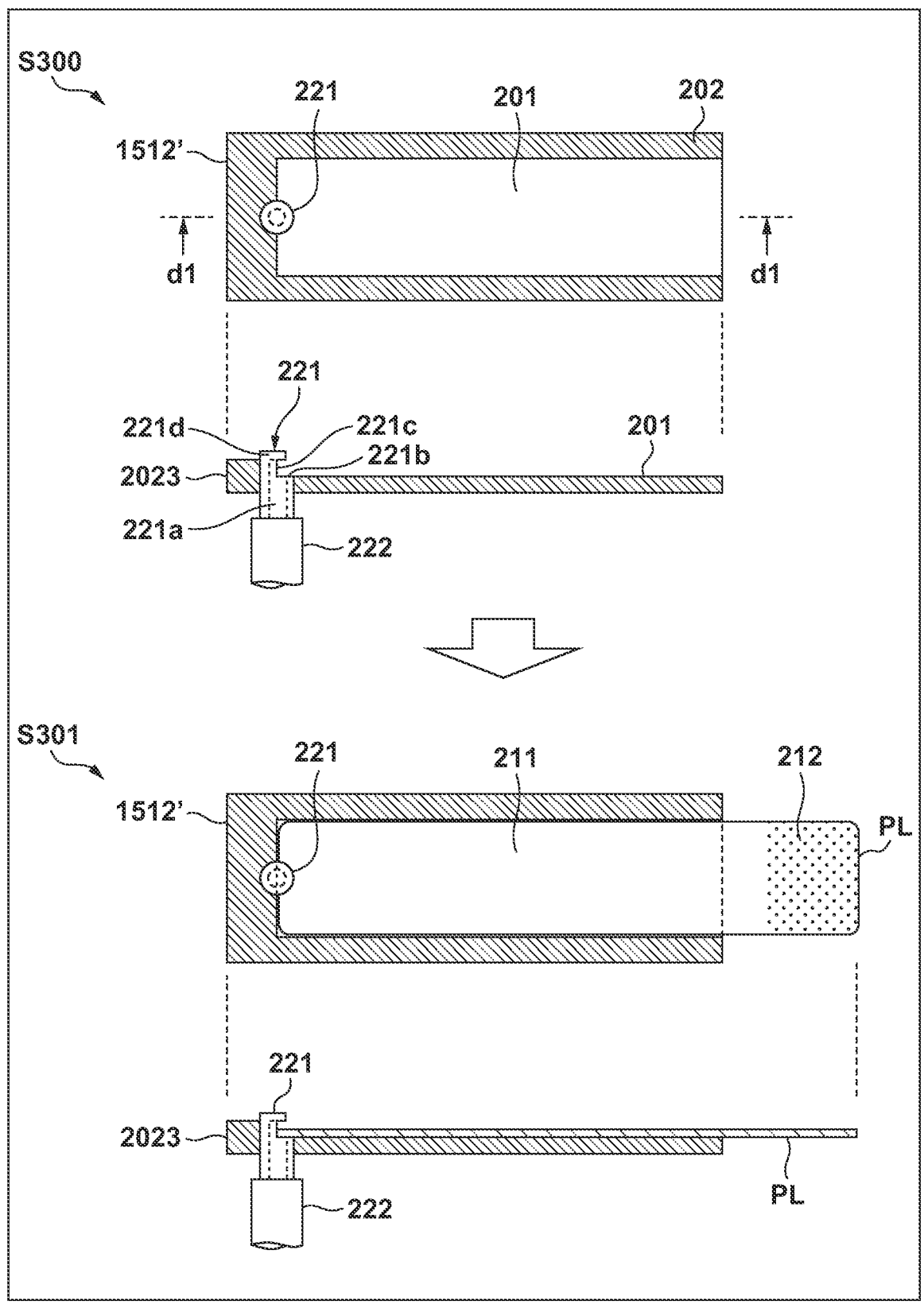
FIG. 16 is a schematic view for explaining another example of the observation sample producing method.

FIG. 16 shows, side by side, a plan view showing the configuration of the holding portion 1512' and a sectional view taken along a line d1-d1 in the plan view (to be simply referred to as a "sectional view" hereinafter, and this also applies to the other sectional views in this embodiment). A state S300 shows a plan view and a sectional view showing a state before a plate PL is arranged on the holding portion 1512' (the state of only the holding portion 1512'). A state S301 shows a plan view and a sectional view showing a state after the plate PL is arranged on the holding portion 1512'.

As will be described later in detail, a liquid discharge mechanism configured to discharge a liquid can be installed in the hole portion 203 of the holding portion 1512', and a liquid pool W1 can thus be removed. The liquid discharge mechanism includes a nozzle 221 configured to suck a liquid, a tube 222 configured to discharge the sucked liquid, and a suction driving mechanism (for example, a pump) (not shown) connected to the tube 222 and configured to execute suction of the liquid by the nozzle 221. That is, one end portion of the plate PL on the side of the nozzle 221 corresponds to an end portion (liquid discharge downstream side end portion) on the downstream side of a direction in which the liquid flows when sucking and discharging the liquid by the nozzle 221, and the other end portion on the opposite side corresponds to an end portion (liquid discharge upstream side end portion) on the upstream side. From this viewpoint, the hole portion 203 (and the liquid discharge mechanism) may be expressed as a liquid discharge portion or the like.

The nozzle 221 includes a channel 221a through which the liquid to be discharged passes, and is formed into a tubular shape. The distal end portion of the channel 221a is opened on one side from the axis of the tube, and is formed by an opening lower portion 221b, an opening side portion 221c, and an opening upper portion 221d. On the opening side portion 221c provided at one end portions of the opening lower portion 221b and the opening upper portion 221d, a part (the outer peripheral portion and a part of the channel portion) of the channel 221a is continuously formed. The opening lower portion 221b forms a part of the placement surface of the placement portion 201. The opening upper portion 221d is formed in the same size as the outer diameter of the nozzle 221.

The thus formed nozzle 221 is inserted into the hole portion 203 provided in the placement portion 201 and arranged to receive a part of an end portion of the plate PL placed on the placement portion 201. When the liquid discharge mechanism (not shown) is operated in this state to start discharging the liquid on the plate PL, the liquid on the plate PL placed on the placement portion 201 moves to the opening side portion 221c of the nozzle 221 via a gap formed between the opening upper portion 221d and the upper surface of the plate PL and is guided to the channel 221a via a path formed by the opening side portion 221c and the end portion of the plate PL and having a semicircular section. The liquid on the plate PL can efficiently be discharged.

Figure 17:
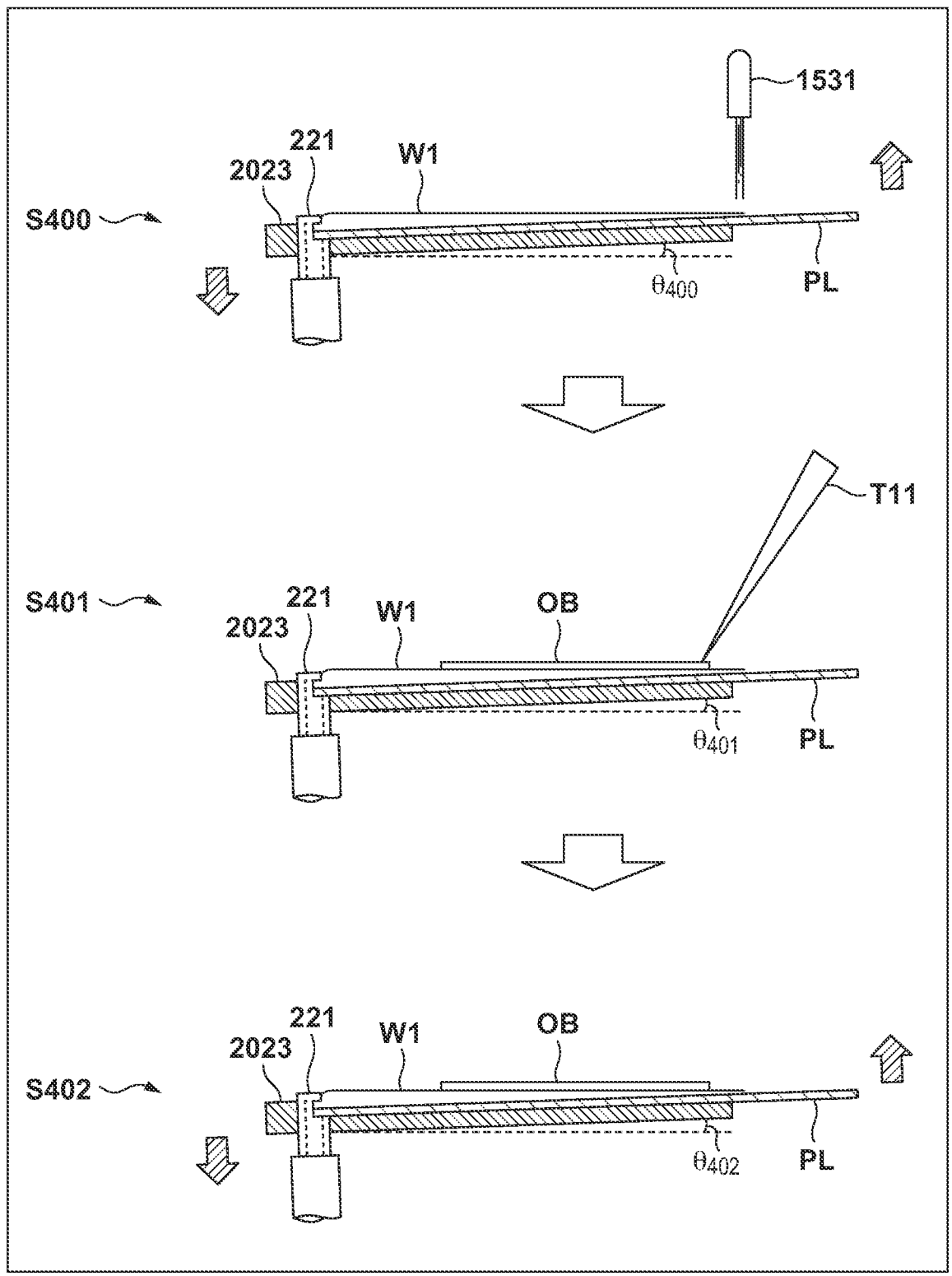
FIG. 17 is a schematic view for explaining another example of the observation sample producing method.

FIG. 17 is a sectional view showing each step of production of an observation sample SPL in a unit 15. The method of producing the observation sample SPL is roughly divided into a step of forming the liquid pool W1 on the plate PL held by the holding portion 1512', a step of placing an observation target object OB on the liquid pool W1, and a step of fixing the observation target object OB to the plate PL while removing the liquid pool W1.

A state S400 shows a sectional view showing a step of tilting the plate PL together with the holding portion 1512' and then supplying a liquid onto the plate PL. First, the holding portion 1512' and the plate PL in a horizontal posture are tilted in a direction indicated by arrows and set in a first tilt posture. Accordingly, one end portion of the plate PL on the side of the nozzle 221 becomes lower than the other end portion. The tilt angle (the angle made by the surface (upper surface) of the plate 1 and the horizontal plane: $\theta_{400}$) at this time is preferably set to about 0.5 to 5 [degrees], and in this embodiment, set to about 1 [degree].

Next, a liquid is supplied onto the plate PL in the state S400 by a nozzle 1531 (of a liquid supply unit 153). As described above, the holding portion 1512' includes the wall portion 202 having a lyophobic property. For this reason, on the plate PL in the tilt posture at the tilt angle $\theta_{400}$, the supplied liquid is blocked by the wall portion 202 and appropriately retained on the plate PL, and the liquid pool W1 is thus formed on the plate PL. More specifically, the supplied liquid is repelled by the lyophobic effect of the wall portion 202 and retained on the plate PL, and the liquid pool W1 is formed such that its surface (the surface on which the observation target object OB is placed later) is located on the upper side of the upper surface of the wall portion 202. The liquid depth of the liquid pool W1 is shallower on the other end portion side than on the one end portion side on the side of the nozzle 221.

A state S401 shows a sectional view showing the step of placing the observation target object OB on the liquid pool W1. The operator places the observation target object OB on the liquid pool W1 using a tool T11. As described above, the liquid depth of the liquid pool W1 is shallower on the other end portion side than on the one end portion side on the side of the nozzle 221. For this reason, the observation target object OB is placed close to the surface of the plate PL on at least the other end portion side. Alternatively, since the observation target object OB can partially sink in the liquid pool W1, it can directly contact the surface of the plate PL on the other end portion side. Note that the tilt angle in the state S401 is shown as a tilt angle $\theta_{401}$ (=$\theta_{400}$).

A state S402 shows a sectional view showing a step of further tilting the plate PL with the observation target object OB placed on the liquid pool W1 and starting discharge of the liquid of the liquid pool W1. That is, the operator further increases the tilt angle of the plate PL (sets a tilt posture steeper than the second tilt posture) at a desired timing to obtain a second tilt posture (shown as a tilt angle $\theta_{402}$ (>$\theta_{401}$)). Accordingly, the liquid of the liquid pool W1 is guided to the nozzle 221, and liquid discharge by the nozzle 221 is started.

The operation of tilting the plate (the operation of changing the tilt angle from $\theta_{401}$ to $\theta_{402}$) after the observation target object OB is placed on the liquid pool W1 and the operation of sucking the liquid by the nozzle 211 may be started almost simultaneously. However, the timings of the start need not always match, and the operations need only be executed while overlapping at least partially. Typically, to prevent the liquid of the liquid pool W1 from flowing from the upper portion of the wall portion 202 of the holding portion 1512', the operation of increasing the tilt angle can be started after the elapse of a predetermined time from the start of the operation of sucking the liquid by the nozzle 211.

Figure 18:
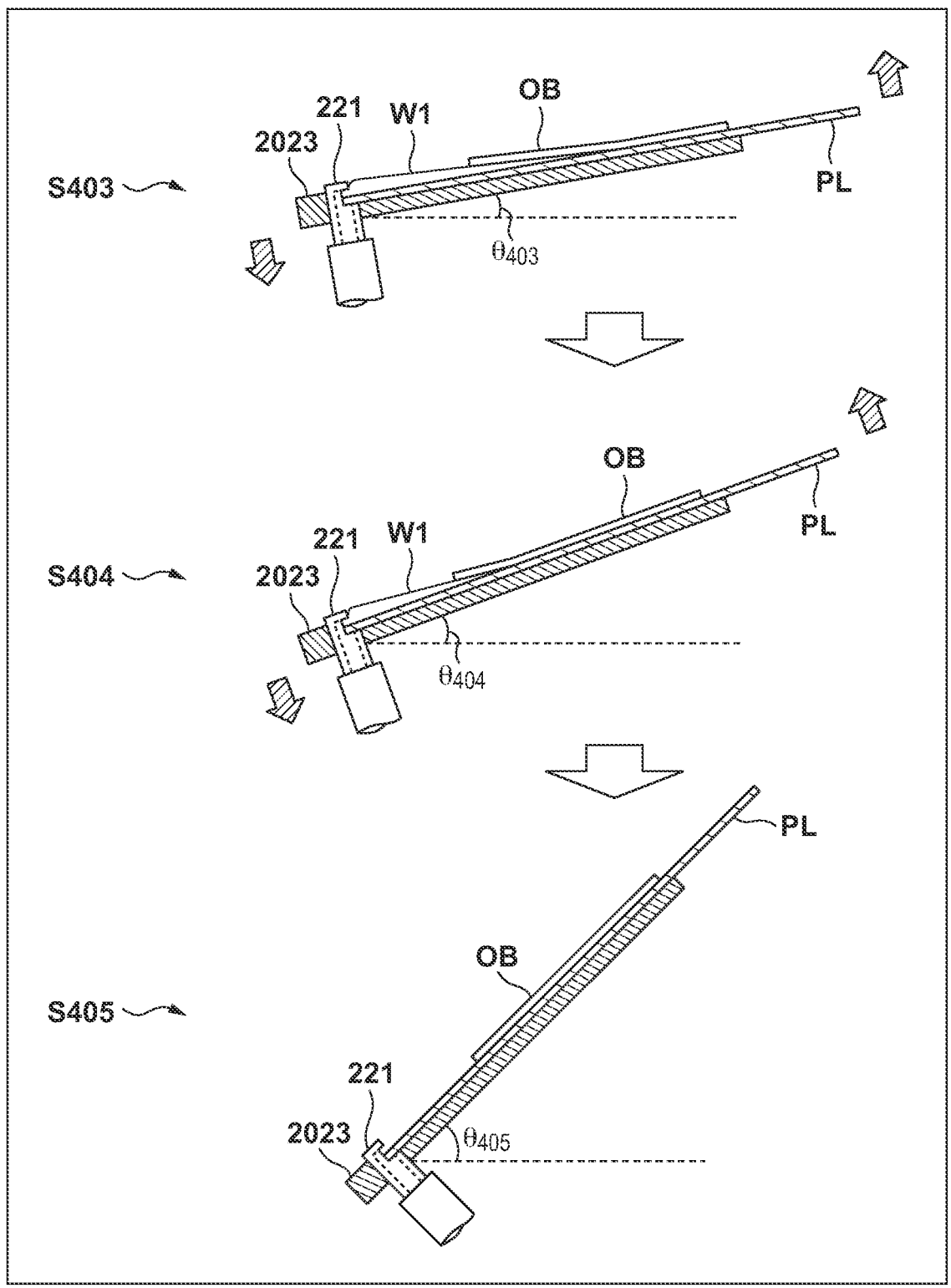
FIG. 18 is a schematic view for explaining another example of the observation sample producing method.

FIG. 18 is a sectional view showing steps of further tilting the plate PL to promote the discharge of the liquid of the liquid pool W1 on the plate PL until completion.

In a state S403, the tilt angle of the plate PL is further increased (a tilt posture steeper than the second tilt posture is set) to obtain a third tilt posture (shown as a tilt angle $\theta_{403}$ (>$\theta_{402}$)). In the state S403, the liquid height level of the liquid lowers (the liquid moves to the side of the nozzle 221) along with the increase of the tilt angle and/or the discharge of the liquid of the liquid pool W1. Hence, the observation target object OB on the liquid pool W1 directly contacts the surface of the plate PL on the other end portion side (the side opposite to the nozzle 221), and/or the contact area becomes large. On the other hand, on the one end portion side (the side of the nozzle 221), the observation target object OB is still located on the liquid pool W1.

In a state S404, the tilt angle of the plate PL is further increased (a tilt posture steeper than the third tilt posture is set) to obtain a fourth tilt posture (shown as a tilt angle $\theta_{404}$ (>$\theta_{403}$)). In the state S404, the area of contact between the observation target object OB on the liquid pool W1 and the surface of the plate PL becomes larger. Accordingly, the observation target object OB can be attached to the surface of the plate PL without causing wrinkles or twists in the observation target object OB.

In a state S405, the tilt angle of the plate PL is further increased (a tilt posture steeper than the fourth tilt posture is set) to obtain a fifth tilt posture (shown as a tilt angle $\theta_{405}$ (>$\theta_{404}$)). In the state S405, the discharge of the liquid of the liquid pool W1 is completed, and the whole observation target object OB is attached to the surface of the plate PL, thereby producing the observation sample SPL. The tilt angle $\theta_{405}$ is, for example, about 40 to 60 [degrees] and is about 45 [degrees] in this embodiment.

As a summary, according to the steps of the states S400 to S405, the observation target object OB is continuously attached to the surface of the plate PL from the other end portion side (the side opposite to the nozzle 221) to the one end portion side (the side of the nozzle 221) along with the discharge of the liquid spreading on the surface of the plate PL (flow-out of the liquid from between the observation target object OB and the surface of the plate PL). That is, after the observation target object OB is partially brought into contact with the surface of the plate PL on the liquid discharge upstream side, the observation target object OB contacts the surface of the plate PL sequentially from the liquid discharge upstream side to the liquid discharge downstream side. This makes it possible to finally fix the observation target object OB to the surface of the plate PL. Hence, according to this embodiment, on the plate PL, the observation target object OB is set in a state in which wrinkles and twists are eliminated/a state easy to observe, and the observation sample SPL can appropriately be produced.

As described above, according to this embodiment as well, the same effects as in the above-described first embodiment can be obtained. That is, it can be said that it is advantageous in improving the working efficiency when producing the observation sample SPL. Note that the points different from the first embodiment have intensively been described here, but the contents of the first embodiment will be applied to the contents omitted in the above explanation.

(Modification)

Figure 19:
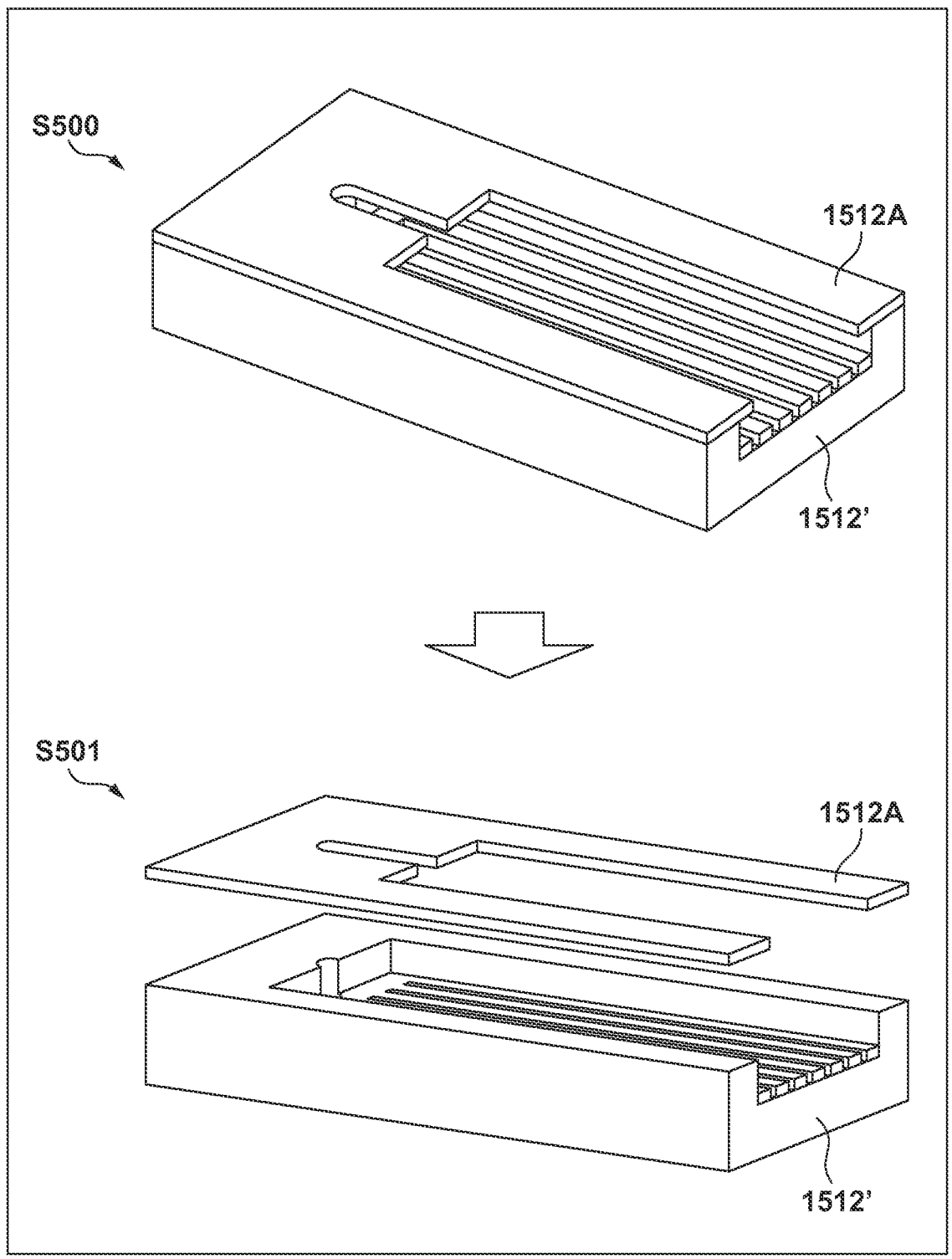
FIG. 19 is a view for explaining still another example of the configuration of the placement member.

FIG. 19 is a perspective view showing a structure in which an attachment member 1512A separate from the holding portion 1512' is attached to the holding portion 1512' as a modification of the second embodiment. A state S500 shows a state in which the attachment member 1512A is attached to the holding portion 1512'. As is apparent from FIG. 19, in the state S500, a gap is formed between the attachment member 1512A and the placement portion 201 of the holding portion 1512', and the plate PL is inserted into the gap and installed (held by the holding portion 1512'). A state S501 shows a state in which the attachment member 1512A is detached from the holding portion 1512'. The holding portion 1512' and the attachment member 1512A are detachable, and these may be fixed to each other by a known fixing method using, for example, a seal, a screw, or the like, or may be fixed by an adhesive.

Figure 20:
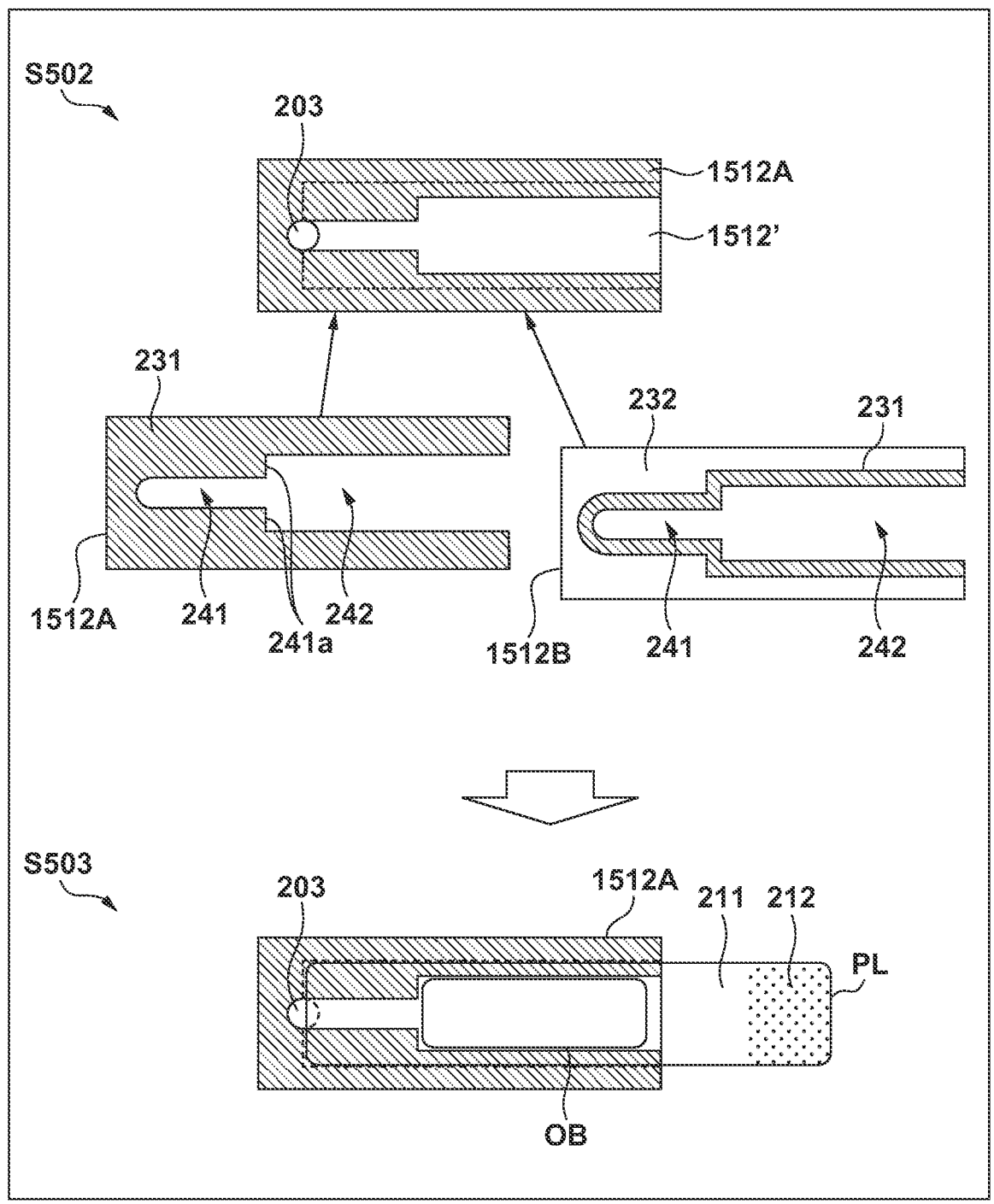
FIG. 20 is a view for explaining still another example of the configuration of the placement member.

FIG. 20 is a plan view for explaining the use method of the holding portion 1512' to which the attachment member 1512A is attached. A state S502 shows a plan view of a state in which the attachment member 1512A is attached to the holding portion 1512'. At least the exposed surface of the attachment member 1512A is made of a lyophobic material (application processing), and in this embodiment, includes a lyophobic portion 231 all over the exposed surface.

The attachment member 1512A includes a narrow guide portion 241 formed in almost the same width as the diameter of the hole portion 203 and in a predetermined length from the upper portion of the hole portion 203 provided at one end portion of the holding portion 1512' to the other end portion side of the holding portion 1512'. The attachment member 1512A also includes a wide guide portion 242 formed in a width larger than the narrow guide portion 241 and in a predetermined length from the narrow guide portion 241 to the other end portion side of the holding portion 1512'. A connecting portion 241a extending in the widthwise direction is formed at the boundary portion between the narrow guide portion 241 and the wide guide portion 242.

In place of the attachment member 1512A, an attachment member 1512B may be attached to the holding portion 1512'. In the attachment member 1512B, the lyophobic portion 231 is formed, on the exposed surface, from the narrow guide portion 241, the wide guide portion 242, and the connecting portions 241a to predetermined regions around these (application processing).

A state S503 shows a plan view of a state in which the plate PL is installed between the attachment member 1512A and the placement portion 201 of the holding portion 1512', and the observation target object OB is arranged and imparted on the wide guide portion 242. This state is a state in which the liquid is supplied from the nozzle 1531 to the plate PL (see the state S400 in FIG. 17). The supplied liquid is retained in the narrow guide portion 241, the wide guide portion 242, and the connecting portions 241a, and the liquid pool W1 is thus appropriately formed. More specifically, the liquid pool W1 is formed such that its upper portion is regulated by the narrow guide portion 241, the wide guide portion 242, and the connecting portions 241a.

After that, the observation target object OB is placed on the liquid pool W1 (see the state S401 in FIG. 17). More specifically, the observation target object OB is placed on the liquid pool W1 in the wide guide portion 242. The observation target object OB need only be storable in the wide guide portion 242 and be larger than the narrow guide portion 241. Accordingly, the movement of the observation target object OB in the widthwise direction is regulated by the wide guide portion 242, and the movement to the side of the narrow guide portion 241 along with the flow of the liquid when discharging the liquid pool W1 is regulated by the connecting portions 241a. It can be said, in this viewpoint, that the narrow guide portion 241 functions as a liquid guide portion (or a guide portion simply) configured to discharge the liquid and can efficiently guide the liquid to the hole portion 203 and discharge it.

The above-described contents are merely examples, and various modifications can be made without departing from the scope of the present invention. For example, in the above-described modification, the holding portion 1512' and the attachment member 1512A are separate bodies and are attachable/detachable to/from each other. However, these may be integrally molded. Alternatively, the placement portion 201 and the wall portion 202 may be detachable separate bodies, and the wall portion 202 and the attachment member 1512A may be integrated. The contents of the above-described modification may be applied to the first embodiment (the attachment member 1512A or 1512B may be configured to be attachable to the holding portion 1512), and similarly, the first embodiment may partially be applied to the modification.

SUMMARY

As described above, one aspect of the present invention is related to the sample producing apparatus 1, and the apparatus 1 produces the observation sample SPL by placing the observation target object OB on the surface of the liquid pool W1 on the plate PL and then removing the liquid pool W1. In the embodiment, the holding portion (placement member) 1512 capable of holding the plate PL is provided on the tilting moving body 1514a. With this configuration, the posture of the plate PL can be changed (for example, set to a horizontal posture or a tilt posture), and the liquid of the liquid pool W1 on the plate PL can be flowed and appropriately discharged (see FIGS. 11 and 12). Hence, the liquid pool W1 is appropriately removed from the plate PL, the observation target object OB is simultaneously appropriately fixed to the surface of the plate PL, and the observation sample SPL is appropriately produced. Hence, the sample producing apparatus 1 according to the present invention is useful in improving the working efficiency when producing the observation sample SPL.

Also, as another aspect of the present invention, the imparting region where the working subject (the operator, a working robot, or the like) accesses the plate PL and imparts the observation target object OB to the plate PL is provided on the upper portion of the corner portion close to both the front wall portion F11 and the side wall portion F12 of the housing 100. The sample producing apparatus 1 is installed on a side portion of the working table 91 such that the corner portion is located on the side of the upper surface of the working table 91. The control unit 172 controls the moving unit 151 to move the holding portion 1512 from the supply position of the plate PL from the pre-processing portion 11 to the holding portion 1512 to a predetermined position (in this embodiment, the imparting position P10) in the imparting region. After that, the observation target object OB extracted by the working subject from the observation target object producing device 92 is imparted to the placement surface of the plate PL. According to the present invention, when the plate PL and the observation target object producing device 92 are arranged in a close distance, the working subject can efficiently appropriately access the plate PL and the observation target object producing device 92. For this reason, when producing the observation sample SPL, the moving distance needed by the working subject can be short. Hence, the sample producing apparatus 1 obtains a high working efficiency and is useful in this point as well.

In the above description, to facilitate understanding, the elements have names associated with their functional aspects. However, the elements are not limited to those having the contents described in the embodiments as main functions, and may have the functions auxiliary. In addition, the individual terms in this specification have been merely used for the purpose of explaining the present invention. That is, the present invention is not limited to the strict meanings of the terms. For example, an apparatus may be expressed as a unit, an assembly, a device, or a module, and vice versa. Also, for example, "move" of a symmetrical object may be expressed as convey or transfer, and vice versa.

The invention is not limited to the foregoing embodiments, and various variations/changes are possible within the spirit of the invention.

The present invention is not limited to the above embodiments and various changes and modifications can be made within the spirit and scope of the present invention. Therefore, to apprise the public of the scope of the present invention, the following claims are made.

The invention claimed is:

1. A sample producing apparatus configured to produce an observation sample formed by imparting an observation target object onto an optically transparent plate, comprising:
   a housing including an exterior panel of the sample producing apparatus;
   a holding portion capable of holding the plate, which a working subject can access to impart the observation target object onto the plate;
   a moving unit capable of moving the holding portion to an imparting region where the working subject imparts the observation target object onto the plate; and
   a control unit configured to control the moving unit,
   wherein the imparting region is provided at a corner portion close to both a front wall portion and one side wall portion of the housing, and
   the control unit controls the moving unit such that the holding portion moves, from a plate supply position which is a supply position of the plate to the holding portion, to an imparting position of the observation target object by the working subject in the imparting region.

2. The sample producing apparatus according to claim 1, further comprising a partition member provided in the housing, the partition member partitioning the imparting region from both a pre-processing region for performing pre-processing for the plate before the plate is held by the holding portion and a post-processing region for performing post-processing for the plate after the observation target object is imparted.

3. The sample producing apparatus according to claim 2, wherein
   the partition member is provided such that the pre-processing region and the post-processing region are in the housing, and the imparting region is outside the housing, and
   the partition member includes:
   an optically transparent plate material through which an inside of the housing can visually be recognized from an outside of the housing; and
   a first opening/closing member configured to allow the working subject to access the inside of the housing from the outside of the housing.

4. The sample producing apparatus according to claim 2, wherein
   the sample producing apparatus comprises a plurality of holding portions,
   the moving unit includes:
   a support table configured to be rotatable and support the plurality of holding portions about a rotation shaft; and
   a driving portion configured to rotationally drive the support table, and
   the control unit controls the moving unit such that the holding portion stops at a position corresponding to the pre-processing region to receive the plate that has undergone the pre-processing, and the holding portion stops at a position corresponding to the post-processing region to perform the post-processing for the plate.

5. The sample producing apparatus according to claim 1, further comprising:
   a plate storage portion configured to store the plate before the observation target object is imparted; and
   a sample storage portion configured to store, as the observation sample together with the imparted observation target object, the plate after the observation target object is imparted,
   wherein the plate storage portion and the sample storage portion are installed in the housing on a side of the front wall portion, and
   the front wall portion is provided with a second opening/closing member configured to allow the working subject to access each of the plate storage portion and the sample storage portion from the outside of the housing.

6. The sample producing apparatus according to claim 5, further comprising a first conveyance unit configured to convey the plate before the observation target object is imparted from the plate storage portion to the holding portion,
   wherein on the side of the front wall portion in the housing, the plate storage portion and the first conveyance unit are installed on an opposite side of the one side wall portion with respect to the holding portion.

7. The sample producing apparatus according to claim 5, further comprising:
   a temperature processing unit configured to perform temperature processing for the plate after the observation target object is imparted; and
   a second conveyance unit configured to convey, as the observation sample, the plate that has undergone the temperature processing by the temperature processing unit and the observation target object on the plate to the sample storage portion,
   wherein in the housing, the temperature processing unit is installed on a side of the one side wall portion to be adjacent to the holding portion, and the second conveyance unit is installed on an opposite side of the front wall portion.

8. The sample producing apparatus according to claim 1, further comprising a tank storage portion capable of storing a liquid tank,
   wherein the liquid tank can store a liquid to be supplied onto the plate held by the holding portion, and
   in the housing, the tank storage portion is installed on the side of the front wall portion and on a lower side of the holding portion.

9. The sample producing apparatus according to claim 1, wherein another side wall portion on the opposite side of the one side wall portion of the housing is provided with a third opening/closing member configured to allow the working subject to access the inside of the housing from the outside of the housing.

10. The sample producing apparatus according to claim 1, wherein the housing is provided with a work assisting portion configured to support a portion of an arm or a hand of the working subject.

11. The sample producing apparatus according to claim 1, wherein the housing has a shape at least partially chamfered at the corner portion.

12. A sample producing system comprising:
a sample producing apparatus defined in claim 1;
a working table juxtaposed adjacent to the one side wall portion with respect to the sample producing apparatus; and
an observation target object producing device configured to produce an observation target object and installed on the working table close to the one side wall portion.

13. The sample producing system according to claim 12, wherein the working subject includes an imparting mechanism configured to extract an observation target object from the observation target object producing device and impart the observation target object onto the plate held by the holding portion of the sample producing apparatus.

14. The sample producing system according to claim 12, further comprising:
a display unit configured to display information of the observation target; and
an information management unit configured to perform information management on the observation target,
wherein the sample producing apparatus further comprises
a pre-processing portion configured to perform processing before the observation target object is imparted on the plate, the pre-processing portion including a reading unit configured to read identification information of the plate,
an observation target object imparting unit for imparting the observation target object on the plate, and
a post-processing portion configured to perform post-processing after the observation target object is imparted on the plate,
the pre-processing portion includes
a plate storage portion configured to store the plate which is before the observation target object is imparted,
a conveyance unit configured to convey the plate from the plate storage portion, and
a printing unit configured to print the identification information on the plate,
the reading unit reads the identification information printed on the plate, and outputs it to the information management unit, and
the information management unit manages information of the observation sample with associating information of the observation target object imparted on the plate, with the identification information of the plate.

15. The sample producing system according to claim 12, further comprising:
a display unit configured to display information of the observation target; and
an information management unit configured to perform information management on the observation target,
wherein the sample producing apparatus further comprises
a pre-processing portion configured to perform processing before the observation target object is imparted on the plate, the pre-processing portion including a reading unit configured to read identification information of the plate,
an observation target object imparting unit for imparting the observation target object on the plate, and
a post-processing portion configured to perform post-processing after the observation target object is imparted on the plate,
the observation sample is one of a plurality of observation samples,
the post-processing portion includes
a transport unit configured to transport the plurality of observation samples, one by one, by a sample placement portion on which the plurality of observation samples are to be placed, and
a temperature processing unit configured to perform temperature processing to the sample placement portion while the transporting, and
the information management unit manages information of the observation sample with associating information of the observation target object imparted on the plate, with the identification information of the plate.

16. The sample producing apparatus according to claim 1, further comprising:
a plate storage portion configured to store the plate which is before the observation target object is imparted;
a sample storage portion configured to store, as the observation sample, the plate which is after the observation target object is imparted and the imparted observation target object; and
an upper support member configured to partition the inside of the housing into an upper space and a lower space, the plate storage portion and the holding portion being in the upper space to be supported by the upper support member, and the sample storage portion being in the lower space.

17. The sample producing apparatus according to claim 1, further comprising:
a plate storage portion configured to store the plate which is before the observation target object is imparted;
a sample storage portion configured to store, as the observation sample, the plate which is after the observation target object is imparted and the imparted observation target object;
a post-processing portion configured to perform post-processing to the plate which is after the observation target object is imparted;
a transfer unit configured to transfer to the sample storage portion the plate received from the post-processing portion, as the observation sample;
an upper support member configured to partition the inside of the housing into an upper space and a lower space,
wherein the upper support member includes a portion to form a communication space which communicates the upper space and the lower space, and
the transfer unit transfers the observation sample from the post-processing portion to sample storage portion through the communication space.

18. The sample producing apparatus according to claim 1, further comprising:
a plate storage portion configured to store the plate which is before the observation target object is imparted; and
a sample storage portion configured to store, as the observation sample, the plate which is after the observation target object is imparted and the imparted observation target object,
wherein the sample storage portion includes a storage portion configured to store a case capable of storing the observation sample,
the storage portion is configured to allow an insertion and an extraction of the case in a first inclined direction, and
the first inclined direction is an upward direction from the inside of the housing to the outside of the housing.

19. The sample producing apparatus according to claim 1, further comprising:
- a plate storage portion configured to store the plate which is before the observation target object is imparted;
- a sample storage portion configured to store, as the observation sample, the plate which is after the observation target object is imparted and the imparted observation target object; and
- a tank storage portion configured to store a liquid tank,
- wherein the liquid tank is capable of storing a liquid to be supplied on the plate which is held by the holding portion, and
- the tank storage portion is set in the housing on a lower side of the holding portion.

20. The sample producing apparatus according to claim 1, further comprising:
- a liquid supply unit configured to supply a liquid on the plate,
- wherein the liquid supply unit includes
  - a nozzle configured to discharge the liquid, and
  - a moving mechanism configured to move the nozzle between a liquid supply position and a standby position, the moving mechanism moving the nozzle to the liquid supply position when a liquid supplying is performed, and to the standby position when the liquid supplying is not performed, and
- the imparting region is opposite to the liquid supply position and the standby position with respect to the front wall portion.

* * * * *